United States Patent [19]

Yoshida

[11] Patent Number: 4,721,928
[45] Date of Patent: Jan. 26, 1988

[54] MULTILEVEL MODULATOR CAPABLE OF PRODUCING A MULTILEVEL QUADRATURE AMPLITUDE MODULATED SIGNAL HAVING ($2^n + \alpha$) OUTPUT SIGNAL POINTS

[75] Inventor: Yasuharu Yoshida, Tokyo, Japan

[73] Assignee: NEC Corporation, Japan

[21] Appl. No.: 933,024

[22] Filed: Nov. 20, 1986

[30] Foreign Application Priority Data

Nov. 21, 1985 [JP] Japan .................................. 60-262846
Nov. 21, 1985 [JP] Japan .................................. 60-262847

[51] Int. Cl.[4] .......................................... H03C 5/00
[52] U.S. Cl. ........................................ 332/31 R; 332/48; 375/39
[58] Field of Search .................... 332/16 R, 17, 23 R, 332/31 R, 48; 375/39, 41; 455/108; 329/110, 122, 124

[56] References Cited

U.S. PATENT DOCUMENTS 4,675,619 6/1987 Uchibori et al. ................ 332/48 X Primary Examiner—Eugene R. LaRoche
Assistant Examiner—Robert J. Pascal
Attorney, Agent, or Firm—Laff, Whitesel, Conte & Saret

[57] ABSTRACT

In a multilevel modulator for use in modulating a main data signal of n bits and a subdata signal of a single bit into a multilevel quadrature amplitude modulated signal, the main data and the subdata signals have a first bit rate $f_1$ and a second bit rate $f_1/m$, respectively, where m is a positive integer which is not less than two. A converting circuit converts the main data signal according to the subdata signal into a binary intermediate signal. The binary intermediate signal is processed by a digital-to-analog converter and a modulator into the multilevel quadrature amplitude modulated signal having output signal points of ($2^n + \alpha$) where $\alpha$ represents an integer which is not less than zero and is not greater than $2^n/m$. A multilevel demodulator carries out an inverse operation to reproduce the modulated signal into the main data signal and the subdata signal.

6 Claims, 18 Drawing Figures

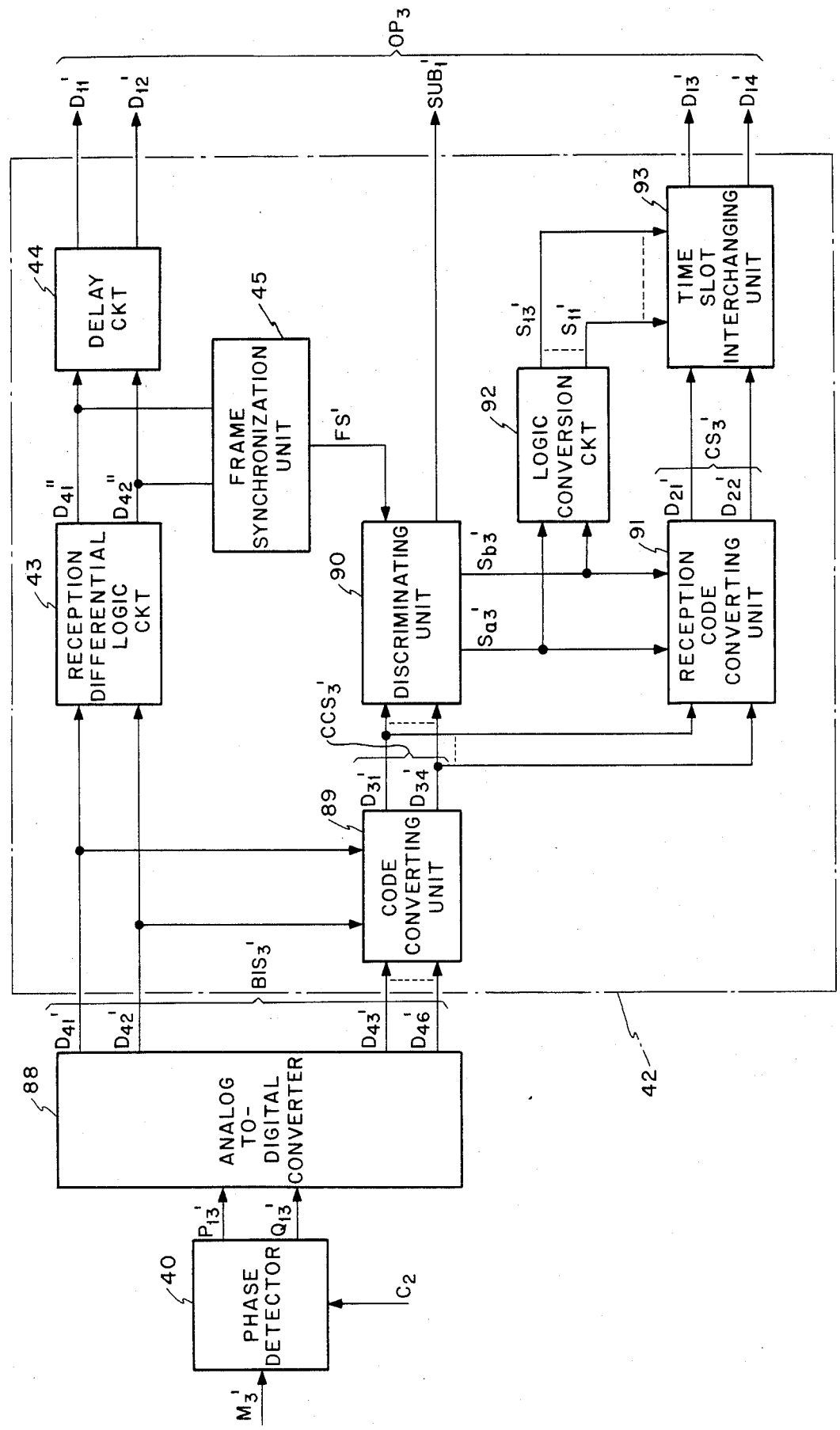

MULTILEVEL MODULATOR CAPABLE OF PRODUCING A MULTILEVEL QUADRATURE AMPLITUDE MODULATED SIGNAL HAVING ($2^n+\alpha$) OUTPUT SIGNAL POINTS

BACKGROUND OF THE INVENTION

This invention relates to a multilevel modulator and to a multilevel demodulator for use as a counterpart of the multilevel modulator.

In a multilevel modulator of the type described, a pair of quadrature-phase carrier signals are amplitude modulated by an input signal into a quadrature amplitude modulated signal. When the input signal is an n-bit binary signal where n is a predetermined number, the quadrature amplitude modulated signal has $2^n$ output signal points specified on a phase plane which has an origin and real and imaginary axes orthogonally crossing at the origin. The output signal points are arranged in a main region, for example, a square region, which has a center point at the origin. The output signal points are in one-to-one correspondence to $2^n$ signal values represented by the n-bit binary signal. Such a multilevel modulator is exemplified in U.S. patent application Ser. No. 779,217 filed Sept. 23, 1985 by Junichi Uchibori et al. for assignment to NEC Corporation and in U.S. patent application Ser. No. 794,662 filed Nov. 4, 1985 by Yasuharu Yoshida, the instant applicant, for assignment to NEC Corporation. The multilevel modulator is called a $2^n$-ary quadrature amplitude modulator. This means that the number of the output signal points are as many as $2^n$, for example, to sixteen, sixty-four, two-hundred and fifty-six, and so on.

In the meanwhile, a recent requirement is directed to transmission of a plurality of input data sequences which have different bit rates from each other. For example, the input data sequences may comprise a main data sequence of a first bit rate and a subdata sequence of a second bit rate lower than the first bit rate. But, the conventional multilevel modulator can not be used to transmit the plurality of input data sequences in the form of the multilevel quadrature amplitude modulated signal. Therefore, the subdata signal sequence must be transmitted through another transmission line different from a transmission line for the main data sequence.

SUMMARY OF THE INVENTION

It is therefore an object of this invention to provide a multilevel modulator which is capable of transmitting a plurality of input data sequences having different bit rates in the form of a multilevel quadrature amplitude modulated signal.

It is another object of this invention to provide a multilevel modulator of the type described, which is capable of producing the multilevel quadrature amplitude modulated signal having output signal points different in number from $2^n$.

It is still another object of this invention to provide a multilevel demodulator which is for use as a counterpart of the multilevel modulator of the type described above.

A multilevel modulator to which this invention is applicable, is for modulating a binary input signal into a multilevel quadrature amplitude modulated signal. The binary input signal comprises a main data signal represented by first through n-th bits each in a time slot where n represents a first predetermined number and a subdata signal represented by one of a first and a second binary value in each succession of first through m-th time slots where m represents a second predetermined number which is not less than two. According to this invention, the multilevel modulator comprises converting means responsive to the main data signal and the subdata signal for converting the main data signal into a binary intermediate signal in accordance with the subdata signal. The binary intermediate signal is represented by first through (n+X)-th intermediate signal bits which specify $2^{(n+X)}$ intermediate signal points where X is equal to two when the first predetermined number is an even number, and equal to unity when the first predetermined number is an odd number. The multilevel modulator further comprises processing means coupled to the converting means for processing the binary intermediate signal into the multilevel quadrature amplitude modulated signal to reduce the $2^{(n+X)}$ intermediate signal points to ($2^n+\alpha$) output signal points where $\alpha$ represents an integer which is not less than zero and is not greater than $2^n/m$. The multilevel quadrature amplitude modulated signal is specified on a phase plane which has an origin and real and imaginary axes orthogonally crossing at the origin and which is divisible into a main region having a center point at the origin and an outside region placed outside of the main region. Main signal points of $2^n$ among the output signal points are in the main region. The main signal points are in one-to-one correspondence to $2^n$ signal values represented by the main data signal only when the subdata signal has the first binary value. Outside signal points of $\alpha$ among the output signal points are in the outside region.

A multilevel demodulator to which this invention is applicable, is for use in demodulating a multilevel quadrature amplitude modulated signal which is modulated by a binary input signal. The binary input signal comprises a main data signal represented by first through n-th bits each in a time slot where n represents a first predetermined number and a subdata signal represented by one of a first and a second binary value in each succession of first through m-th time slots where m represents a second predetermined number which is not less than two. The multilevel demodulator comprises processing means for processing the multilevel quadrature amplitude modulated signal into a binary intermediate signal represented by first through (n+X)-th intermediate signal bits where X is equal to two when said first predetermined number is an even number and equal to unity when said first predetermined number is an odd number. According to this invention, the multilevel demodulator further comprises converting means coupled to the processing means for converting said binary intermediate signal into a binary output signal as a reproduction of the main data signal and a reproduction of the subdata signal.

BRIEF DESCRIPTION OF THE DRAWING

FIG. 16 is a block diagram of a multilevel demodulator for use as a counterpart of the multilevel modulator illustrated in FIG. 14;

DESCRIPTION OF THE PREFERRED EMBODIMENTS

Figure 1:
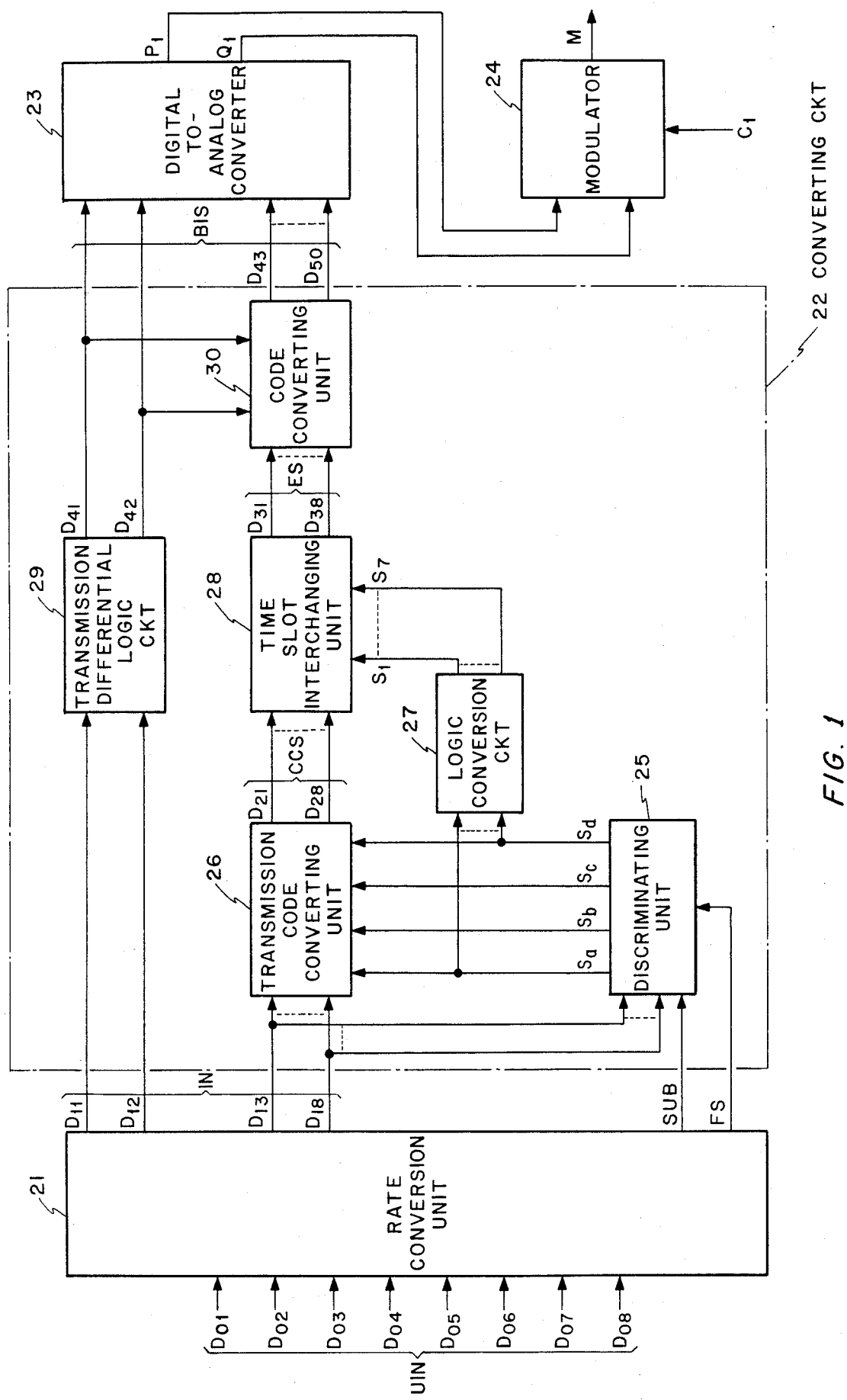
FIG. 1 is a block diagram of a multilevel modulator according to a first embodiment of this invention.

Referring to FIG. 1, a multilevel modulator according to a first embodiment of this invention is for use in combination with a rate conversion unit 21 placed before the multilevel modulator. The rate conversion unit 21 is for use in converting a unit input signal UIN into a binary input signal.

In the example being illustrated, the unit input signal UIN consists of first through eighth binary signals $D_{01}$ to $D_{08}$ each of which is given in bit parallel from an external circuit (not shown) to the rate conversion unit 21 at a preselected bit rate. The first through eighth binary signals $D_{01}$ to $D_{08}$ may be given in bit series. The illustrated binary input signal consists of a main data signal IN corresponding to the unit input signal UIN and a subdata signal SUB. The main data signal IN consists of first through eighth bits $D_{11}$ to $D_{18}$ each of which is produced in bit parallel at a first bit rate $f_1$ while the subdata signal SUB consists of a single bit and is produced at a second bit rate $f_2$ which is slower than the first bit rate $f_1$. Each of the first through eighth bits $D_{11}$ to $D_{18}$ is allocated to a sequence of time slots bit by bit.

In the manner known in the art, first and second bit periods may be used in place of the first and the second bit rates $f_1$ and $f_2$. In this event, the first bit period is shorter than the second bit period. If the preselected bit rate of the unit input signal UIN is represented by $f_m$, the bit rate $f_m$ is given by: $8f_m = 8f_1 + f_2$.

In FIG. 1, the second bit rate $f_2$ is equal to $(f_1/m)$ where m is a positive integer which is equal to or greater than two. In this example, the positive integer m is assumed to be four. Accordingly, the second bit period of the subdata signal SUB is equal to an integral multiple of the first bit period of the main data signal IN.

A frame signal FS is also produced as a part of the binary input signal by the rate conversion circuit 21 and is used for frame synchronization. The frame signal FS has a frame period greater than the second bit period of the subdata signal SUB. Such a rate conversion circuit can be constituted by the use of a conventional circuit technique and will not be described any longer.

Figure 2:
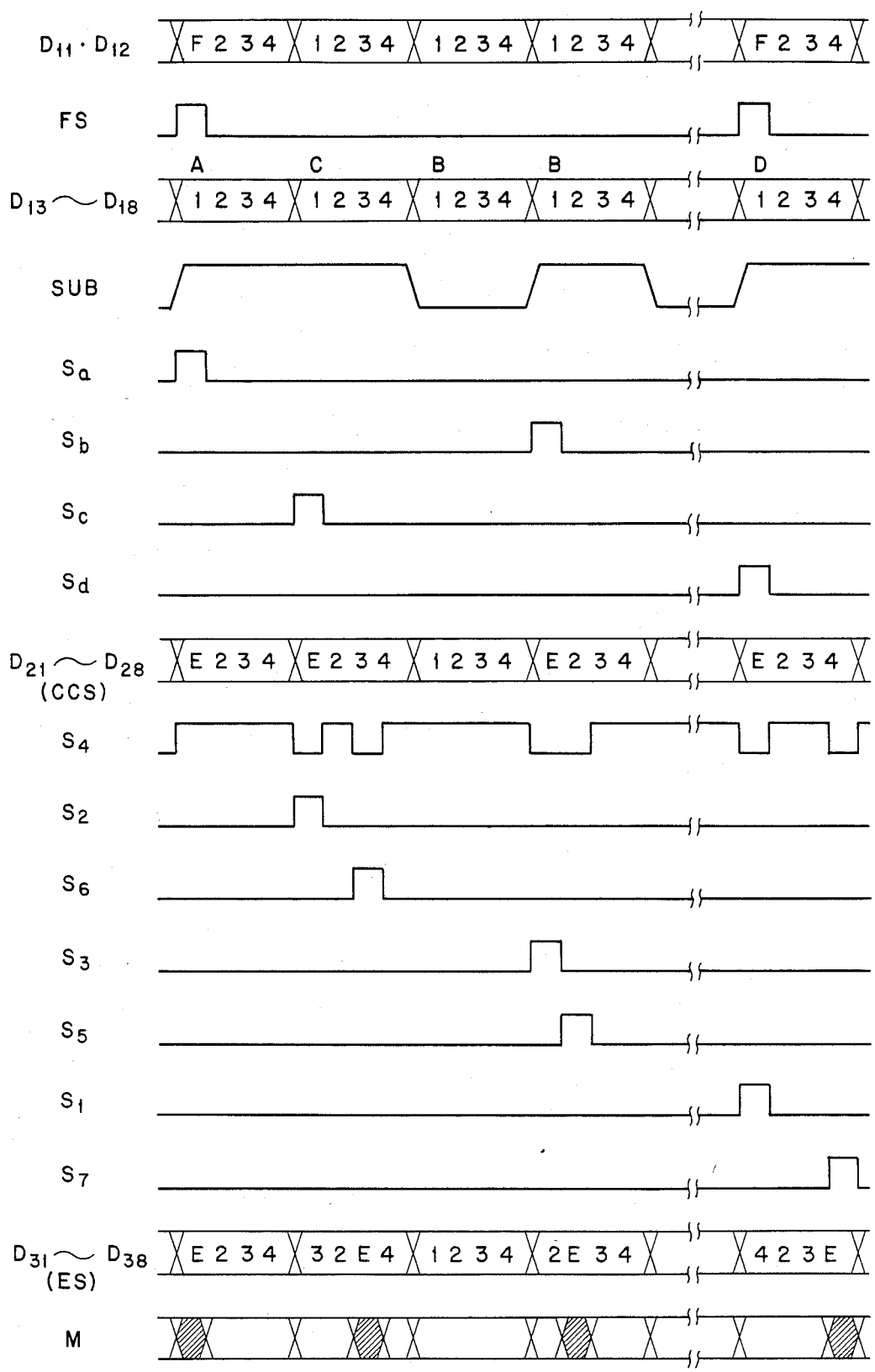
FIG. 2 shows a time chart for use in describing operation of the multilevel modulator illustrated in FIG. 1.

Referring to FIG. 2 together with FIG. 1, each of the first and the second bits $D_{11}$ and $D_{12}$ is shown along a top line of FIG. 2 and is synchronized with the frame signal FS illustrated along a second line of FIG. 2. Each of the third through eighth bits $D_{13}$ to $D_{18}$ is illustrated along a third line of FIG. 2 and appears in synchronism with each of the first and the second bits $D_{11}$ and $D_{12}$. Each bit of the first through eighth bits $D_{11}$ to $D_{18}$ is arranged in one of the time slots, as mentioned before, and is partitioned into a plurality of partial bit signals in relation to the positive integer m. In the illustrated example, each partial bit signal consists of four bits which are arranged in first through fourth ones of the time slots numbered from 1 to 4, respectively, as shown along the first and the third lines of FIG. 2. The first and the second bits $D_{11}$ and $D_{12}$ convey a frame synchronization signal F in synchronism with the frame signal FS. The frame synchronization signal F may be produced each time when the partial bit signals are counted to twenty-four.

As shown along a fourth line of FIG. 2, the subdata signal SUB is represented by one of a first and a second binary values, such as a binary zero and a binary one, in each succession of m bits of the partial bit signals. In the example depicted, the subdata signal SUB takes a pattern of 1, 1, 0, 1, . . . , 1, and 1. It is apparent that a single bit of the subdata signal SUB lasts for first through fourth time slots of each of the first through eighth bits $D_{11}$ to $D_{18}$. Thus, the subdata signal SUB can be transmitted at every m time slots.

Referring back to FIG. 1, the multilevel modulator is for use in modulating the main data signal IN and the subdata signal SUB into a multilevel quadrature amplitude modulated signal M. The multilevel quadrature amplitude modulated signal M has, on a phase plane, a plurality of output signal points, $2^n + \alpha$ in number, where n is a number equal to parallel bits of the main data signal IN and $\alpha$ is an integer which is not negative and is determined in relation to $2^n$. Thus, the output signal points may be divided into first signal points of $2^n$ in number and second signal points of $\alpha$ in number. The first and the second signal points will be called main and outside signal points, respectively. In this example, n and $\alpha$ are equal to eight and sixty-four, respectively. Therefore, it is seen that $\alpha$ is given by:

$$\alpha \geq 2^n/m$$

The output signal points illustrated in the example are equal in number to 320.

The phase plane has an origin and real and imaginary axes orthogonally crossing at the origin and is divisible into a main region having a center point at the origin and an outside region placed outside of the main region. The main region is symmetric on both sides of each of the real and the imaginary axes. The main signal points of $2^n$ are arranged in the main region while the outside signal points of $\alpha$ are arranged in the outside region.

The phase plane is divided by the real and the imaginary axes into first through fourth quadrants. The main region is divided by the real and the imaginary axes into first through fourth domains which are congruent with one another and which are specified by the first and the second bits $D_{11}$ and $D_{12}$, or first and second bits of the main data signal. The first through the fourth domains are in the first through the fourth quadrants, respectively.

It is to be noted that each domain is divided into first through m-th zones, namely, first through fourth zones in this example, and that the first through m-th zones are congruent with one another and correspond to the first through the m-th time slots, respectively, as will later be described in detail.

The multilevel modulator comprises a converting circuit 22, a digital-to-analog converter 23, and a modulator 24 which may be referred to as first, second, and third converting circuits, respectively. The converting circuit 22 is for use in converting the main data signal IN in parallel into a binary intermediate signal BIS which has 10 bits in parallel in each time slot in a manner to be described hereinunder.

Figure 3:
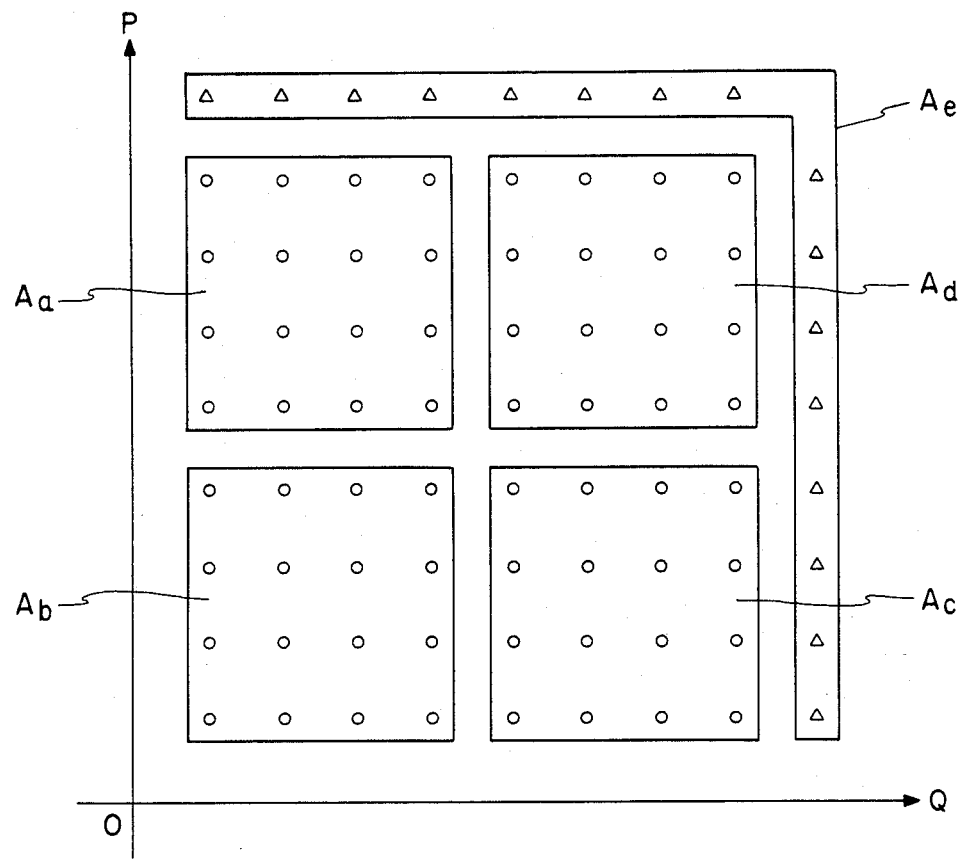
FIG. 3 shows an output signal point distribution of a multilevel quadrature amplitude modulated signal produced by the multilevel modulator illustrated in FIG. 1.

Referring to FIG. 3 together with FIG. 1, the converting circuit 22 will be described in detail. The description will be restricted to a first one of the domains. The origin, the real axis, and the imaginary axis are depicted at O, P, and Q. Similar operation can be carried out in the remaining domains.

In FIG. 3, a quarter of the output signal points is placed in the first quadrant and divided into the main signal points depicted by small circles and the outside signal points depicted by small triangles. The main and the outside signal points are equal in number to 64 and 16, respectively, and are in the first domain and the outside region, respectively.

The first domain is divided into first through fourth square zones which are indicated at Aa, Ab, Ac, and Ad, respectively, and each of which includes sixteen main signal points. In the example being illustrated, the outside region surrounds the main region as shown at Ae and may be named a specific region. It is readily possible to understand an arrangement of the output signal points in the second through fourth quadrants by rotating an arrangement of FIG. 3 by 90°, 180°, and 270°, respectively.

Briefly, the converting circuit 22 is operable to shift the main signal points to the outside region in accordance with the subdata signal SUB, if the subdata signal SUB is present.

Referring back to FIG. 1, the first and the second bits $D_{11}$ and $D_{12}$ of each time slot specify one of the first through the fourth quadrants as a particular domain. It will be assumed that the particular domain is the first domain. The third through the eighth bits $D_{13}$ to $D_{18}$ are used to specify the first through fourth zones Aa to Ad and the specific region Ae in the first domain in cooperation with the subdata signal SUB. The converting circuit 22 comprises a discriminating unit 25 which may be called a decoder. The discriminating unit 25 is supplied with the third through eighth bits $D_{13}$ to $D_{18}$, the subdata signal SUB, and the frame signal FS. The discriminating unit is for discriminating one of the first through the fourth zones Aa to Ad specified by the third through the eighth bits $D_{13}$ to $D_{18}$. The discriminating unit 25 carries out the above-described discriminating operation with regard to a predetermined time slot of the four successive time slots (FIG. 2). It will be assumed without loss of generality that the predetermined time slot is the first time slot. As shown along fifth through eighth lines of FIG. 2, the discriminating unit 25 produces, in correspondence to the subdata signal SUB, one of indication signals Sa to Sd which correspond to the first through the fourth zones Aa to Ad, respectively. In FIG. 2, the discriminating unit 25 produces the indication signal only when the subdata signal SUB takes a logic "1" level. Alternatively, the discriminating unit 25 may produce the indication signal only when the subdata signal SUB takes a logic "0" level. In the third line of FIG. 2, each of characters A to D is made to correspond to the zone which includes the output signal point represented by the third through the eighth bits $D_{13}$ to $D_{18}$ of the first time slot.

Figure 4:
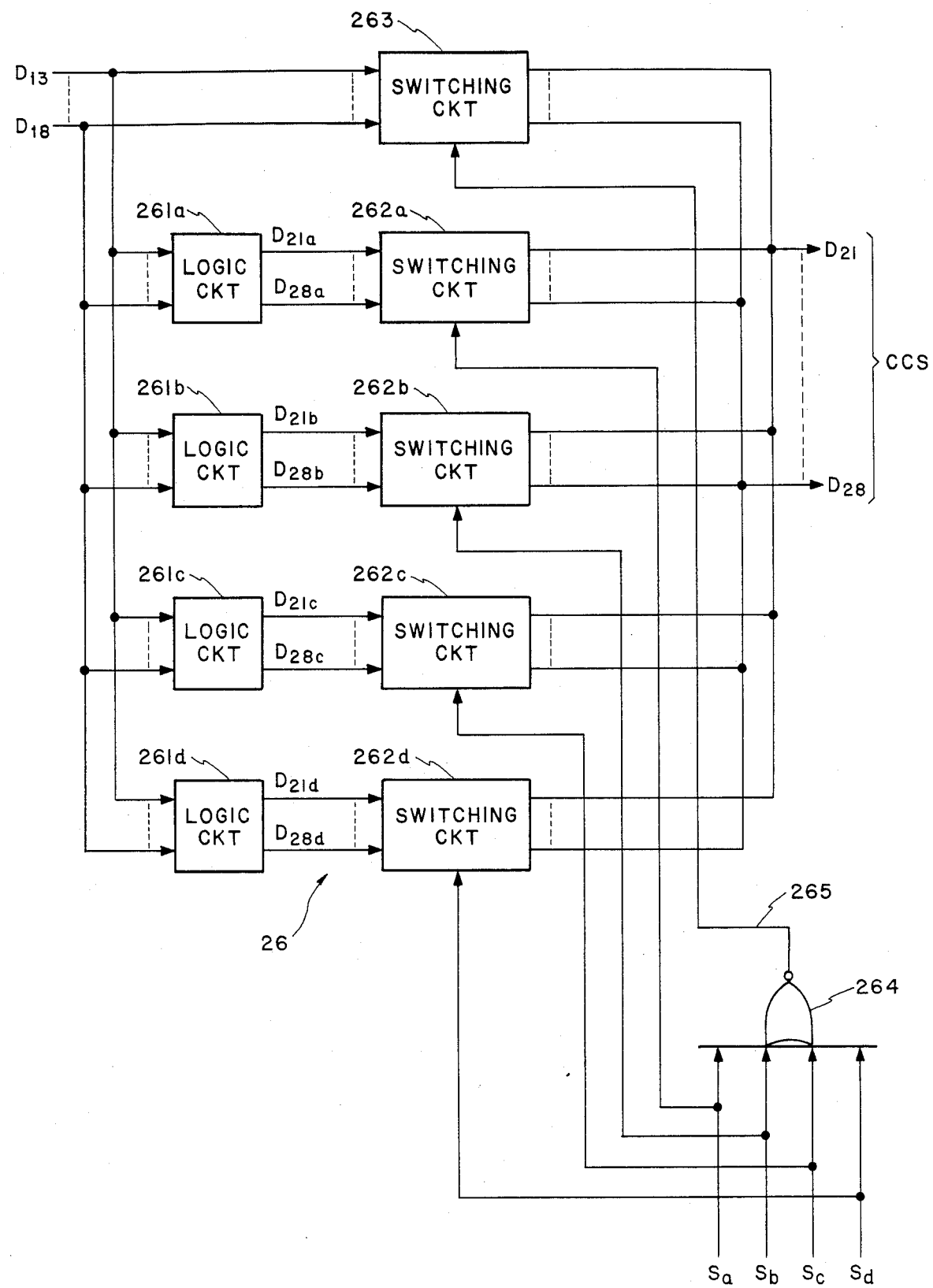
FIG. 4 is a block diagram of a transmission code converting unit operable as a part of the multilevel modulator illustrated in FIG. 1.

The third through the eighth bits $D_{13}$ to $D_{18}$ are sent to a transmission code converting unit 26 which will be described in conjunction with FIG. 4. The transmission code converting unit 26 is for converting the third through the eighth bits $D_{13}$ to $D_{18}$ in response to the first through the fourth indication signals Sa to Sd into a code converted signal CCS. As shown along a ninth line of FIG. 2, the code converted signal CCS consists of first through eighth bits $D_{21}$ to $D_{28}$.

The transmission code converting unit 26 comprises first through fourth logic circuits 261a to 261d, first through fourth switching circuits 262a to 262d, an additional switching circuit 263, and a NOR circuit 264. The first logic circuit 261a carries out a predetermined code conversion and produces a circuit signal. The circuit signal consists of first through eighth bits 21a to 28a. The predetermined code conversion is for shifting the main signal points in the first zone Aa to the specific region Ae. Likewise, the second through the fourth logic circuits 261b to 261d serve to shift the main signal points to the specific region Ae, respectively. The first switching circuit 262a allows all of the first through the eighth bits $D_{21a}$ to $D_{28a}$ to pass through as the code converted signal CCS on reception of the first indication signal Sa of the logic "1" level. The second through the fourth switching circuits 262b to 262d are similar to the first switching circuit 262a except for the second through the fourth indication signals Sb to Sd. The NOR circuit 264 supplies a switch control signal 265 of a logic "1" level to the additional switching circuit 263 when all of the first through the fourth indication signals Sa to Sd take a logic "0" level. On reception of the switch control signal 265 of logic "1" level, the additional switching circuit 263 allows the third through the eighth bits $D_{13}$ to $D_{18}$ to pass through as the first through the sixth bits $D_{21}$ to $D_{26}$ without any modification. The additional switching circuit 263 produces two logic "0" levels as the seventh and the eighth bits $D_{27}$ and $D_{28}$ together with the first through the sixth bits $D_{21}$ to $D_{26}$. Output lines for the first bit of the respective switching circuits 262a to 262d and 263 are connected together. Likewise, respective remaining output lines for the second through the eighth bits are connected together.

Thus, the transmission code converting unit 26 converts the third through the eighth bits $D_{13}$ to $D_{18}$ of the binary main data signal IN into the code converted signal CCS in accordance with the indication signals Sa to Sd. Incidentally, the transmission code converting unit 26 may be implemented by a read only memory wherein the first through the eighth bits $D_{21}$ to $D_{28}$ are read out with the third through the eighth bits $D_{13}$ to $D_{18}$ and the indication signals Sa to Sd used as address signals.

In the ninth line of FIG. 2, characters E show the time slots wherein the third through the eighth bits $D_{13}$ to $D_{18}$ are subjected to conversion to transmit the subdata signal SUB of the logic "1" level. In other words, the main signal point in either one of the first through the fourth zones Aa to Ad is shifted to the specific region Ae.

It is assumed that the code converted signal CCS of eight bits is restricted to six bits and thereafter transmitted from the modulator to a demodulator. In this event, the demodulator might detect the specific time slots carrying the subdata signal SUB. However, the demodulator can not decide one of the first through the fourth zones Aa to Ad that is assigned to the main data signal because no information is carried by the restricted code converted signal as regards the first through the fourth zones. In other words, a shifted zone can not be returned back to the first through the fourth zones in the demodulator when the code converted signal CCS is restricted to six bits.

In order to enable discrimination of the first through the fourth zones Aa to Ad in the demodulator, time slot interchanging operation is carried out on the code converted signal CCS in a manner to be described presently.

Figure 5:
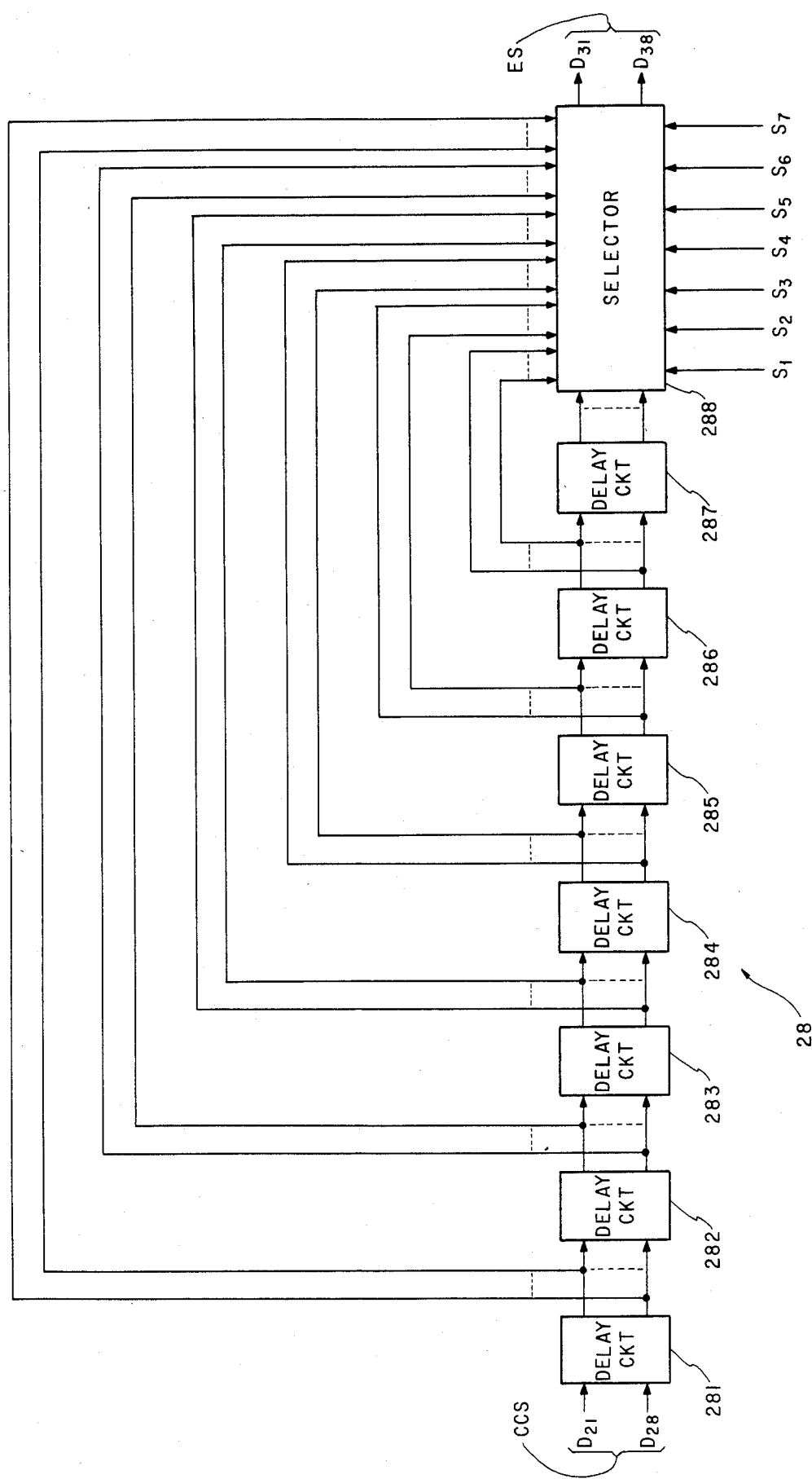
FIG. 5 is a block diagram of a time slot interchanging unit operable as a part of the multilevel modulator illustrated in FIG. 1.

Referring to FIG. 5 together with FIGS. 1 and 2, the converting circuit further comprises a logic conversion circuit 27 and a time slot interchanging unit 28 both of which are operable to carry out the time slot interchanging operation. More particularly, the logic conversion circuit 27 generates first through seventh control signals $S_1$ to $S_7$ (shown along tenth through sixteenth lines of FIG. 2) in response to the first through the fourth indication signals Sa to Sd. Description will be made with regard to the four successive time slots.

On reception of the first indication signal Sa or in the absence of the indication signals Sa to Sd, the fourth control signal $S_4$ lasts for the four successive time slots. Responsive to the third indication signal Sc, the logic conversion circuit 27 generates the second control signal $S_2$, the fourth control signal $S_4$, the sixth control signal $S_6$, and the fourth control signal $S_4$ one after another in each of the first through the fourth time slots. Supplied with the second indication signal Sb, the logic conversion circuit 27 generates the third and the fifth control signals $S_3$ and $S_5$ one after another in the first and the second time slots. Thereafter, the fourth control signal $S_4$ is produced in the third and the fourth time slots. Responsive to the fourth indication signal Sd, the logic conversion circuit 27 generates the first control signal $S_1$ in the first time slot and generates the fourth control signal $S_4$ in the second and the third time slots and then generates the seventh control signal $S_7$ in the fourth time slot. Thus, the logic conversion circuit 27 delivers any one of the first through the seventh control signals $S_1$ to $S_7$ one by one to the time slot interchanging unit 28.

Responsive to the first and the seventh control signals $S_1$ to $S_7$, the time slot interchanging unit 28 is for use in interchanging the code converted signal CCS from the first time slot into a different time slot and vice versa in the four successive time slots. It will be readily understood that the different time slot corresponds to the number given to the shifted zone. The time slot interchanging unit 28 produces first through eighth bits $D_{31}$ to $D_{38}$ as an interchanged signal ES.

Referring to FIG. 5 together with FIG. 1, the time slot interchanging unit 28 comprises first through seventh delay circuits 281 to 287 and a selector 288. The selector 288 is for selecting only one output signal of the first through the seventh delay circuits 281 to 287 in response to the first through the seventh control signals $S_1$ to $S_7$. For example, the selector 288 selects the output signal of the first delay circuit 281 in response to the first control signal $S_1$. As shown along a seventeenth line of FIG. 2, the selector 288 allows the code converted signal CCS of the first through the fourth time slots to pass through without any exchange or interchange of the first through the fourth time slots in response to the control signal $S_4$. On the other hand, when the selector 288 is supplied with the control signals $S_2$ and $S_6$ in the first and the third time slots, the code converted signals CCS are interchanged between the first time slot and the third time slot. Thus, time slot interchanging operation is carried out between the first and the third time slots. When the selector 288 is supplied with the control signals $S_3$ and $S_5$ in the first and the second time slots, the first time slot is interchanged to the second time slot to interchange the code converted signals CCS between the first and the second time slots. Likewise, the selector 288 interchanges the first and the fourth time slots in response to the control signals $S_1$ and $S_7$. The code converted signals CCS are interchanged between the first time slot and the fourth time slot.

Thus, the time slot interchanging unit 28 produces the interchanged signal ES wherein an order of the time slots of the code converted signal CCS is interchanged in the four successive time slots.

Referring back to FIG. 1, a transmission differential logic circuit 29 is supplied with the first and the second bits $D_{11}$ and $D_{12}$ of the main data signal IN. The transmission differential logic circuit 29 is operable in a known manner to produce a pair of encoded bits $D_{41}$ and $D_{42}$. As known in the art, the transmission differential logic circuit 29 serves to avoid any influence resulting from uncertainty of phase of a reference carrier signal reproduced in the demodulator.

A code converting unit 30 is operable in response to the encoded bits $D_{41}$ and $D_{42}$ and the interchanged signal ES. The code converting unit 30 is for use in carrying out rotation-symmetry conversion of the encoded bits $D_{41}$ and $D_{42}$ and the interchanged signal ES to produce the binary intermediate signal BIS of ten bits. First and second ones of the binary intermediate signal BIS are the encoded bits $D_{41}$ and $D_{42}$ of the transmission differential logic circuit 29 while third through tenth ones of the binary intermediate signal BIS are produced by the code converting unit 30 as a result of the rotation-symmetry conversion. The rotation-symmetry conversion is to represent each output signal point of an optional quadrant by an identical code even when each output signal point is rotated by 90°, 180°, and 270° around the origin 0 of the phase plane.

The rotation-symmetry conversion serves to remove any adverse influence which might otherwise occur in the binary intermediate signal BIS.

The transmission differential logic circuit 29 and the code converting unit 30 are exemplified in the above-referenced U.S. patent application Ser. No. 794,662 and will not be described any longer.

Thus, the converting circuit 22 converts the main data signal IN of eight bits into the binary intermediate signal BIS of ten bits ($10=n+X$) because n is an even number and X is equal to two.

The binary intermediate signal BIS is divided into first and second binary intermediate signal parts for p-channel and q-channel digital signals, respectively. The first binary intermediate signal part consists of first, third, fifth, seventh, and ninth bits $D_{41}$, $D_{43}$, $D_{45}$, $D_{47}$, and $D_{49}$. The second binary intermediate signal part consists of second, fourth, sixth, eighth, and tenth bits $D_{42}$, $D_{44}$, $D_{46}$, $D_{48}$, and $D_{50}$. The first and the second binary intermediate signal parts are sent to the digital-to-analog converter 23. The digital-to-analog converter 23 converts the first and the second binary intermediate signal parts into first and second analog signals $P_1$ and $Q_1$ as first and second multilevel signals. In the above-described digital-to-analog conversion, each of the first and the second analog signals $P_1$ and $Q_1$ can specify sixteen levels when both of the ninth and the tenth bits $D_{49}$ and $D_{50}$ take a logic "1" level in common. On the other hand, each of the first and the second analog signals $P_1$ and $Q_1$ can specify eighteen levels when both of the ninth and the tenth bits $D_{49}$ and $D_{50}$ take a logic "0" level in common. Such an operation is described in the cited reference hereinbefore and will not be described in the instant specification.

The first and the second analog signals $P_1$ and $Q_1$ are sent to the modulator 24. The modulator 24 modulates a pair of quadrature-phase carrier signals $C_1$ by the first and the second analog signals $P_1$ and $Q_1$ and produces the multilevel quadrature amplitude modulated signal M.

Along a bottom line of FIG. 2, hatched time slots show that the output signal points of the multilevel quadrature amplitude modulated signal M belong to the specific region Ae and have high amplitude.

As thus far been described above, the multilevel modulator can transmit the multilevel quadrature amplitude modulated signal M which has three hundred and twenty signal points ($320=256+64$). Each of the first through the eighth bits $D_{11}$ to $D_{18}$ has the bit rate $f_1$. The subdata signal SUB has the bit rate $f_1/4$. Accordingly, the multilevel quadrature amplitude modulated signal M has a symbol rate represented by ($8f_1+f_1/4$). On the contrary, the conventional multilevel modulator for two hundred and fifty-six output signal points has the symbol rate $8f_1$. Accordingly, the symbol rate of the embodiment can be increased by a factor of $(8f_1+f_1/4)/(8f_1)=33/32$ when an occupied bandwidth is common. On the other hand, the occupied bandwidth of the embodiment can be reduced by a factor of 32/33 when the symbol rate is common.

Figure 6:
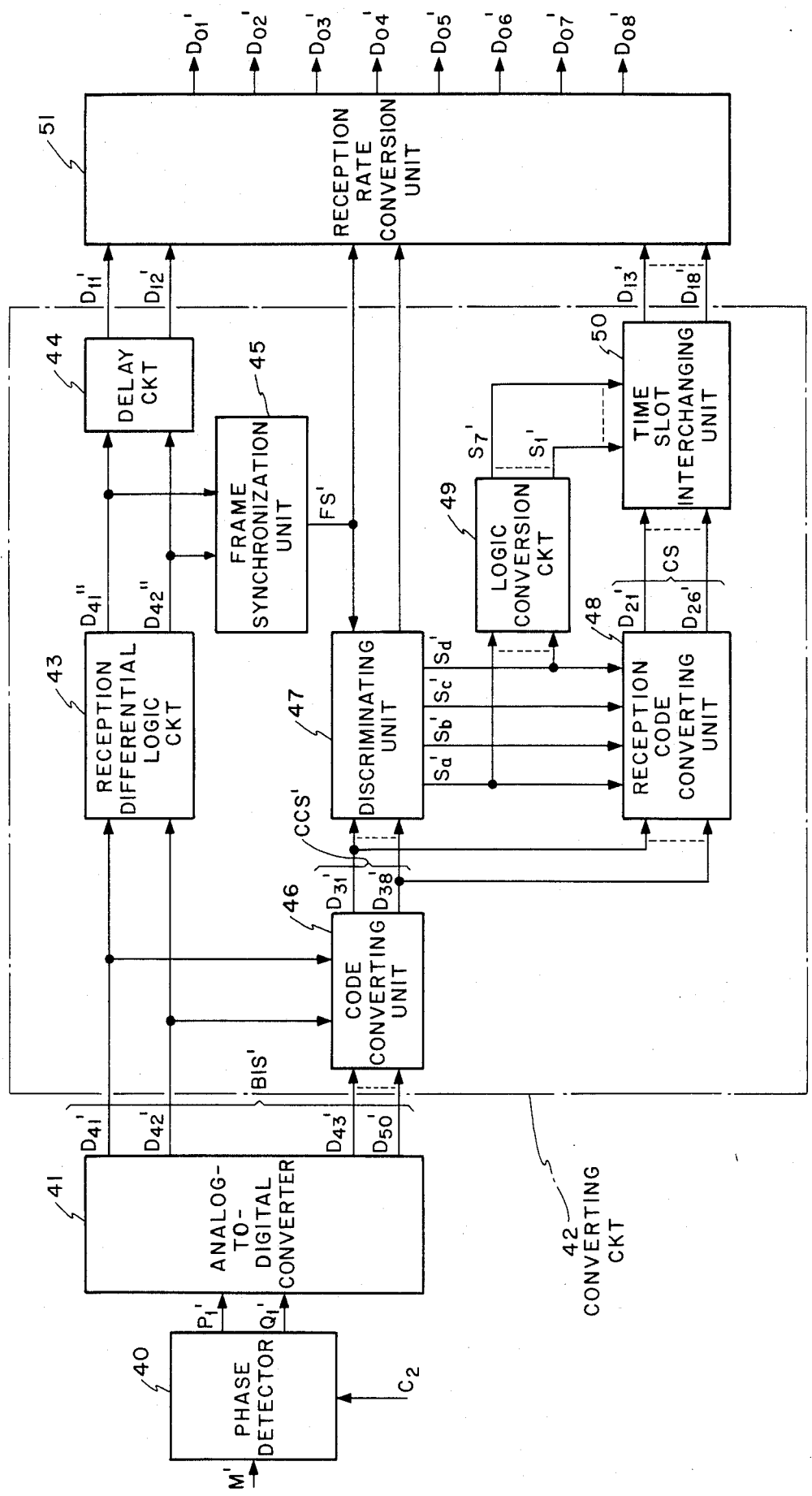
FIG. 6 is a block diagram of a multilevel demodulator for use as a counterpart of the multilevel modulator illustrated in FIG. 1.
Figure 7:
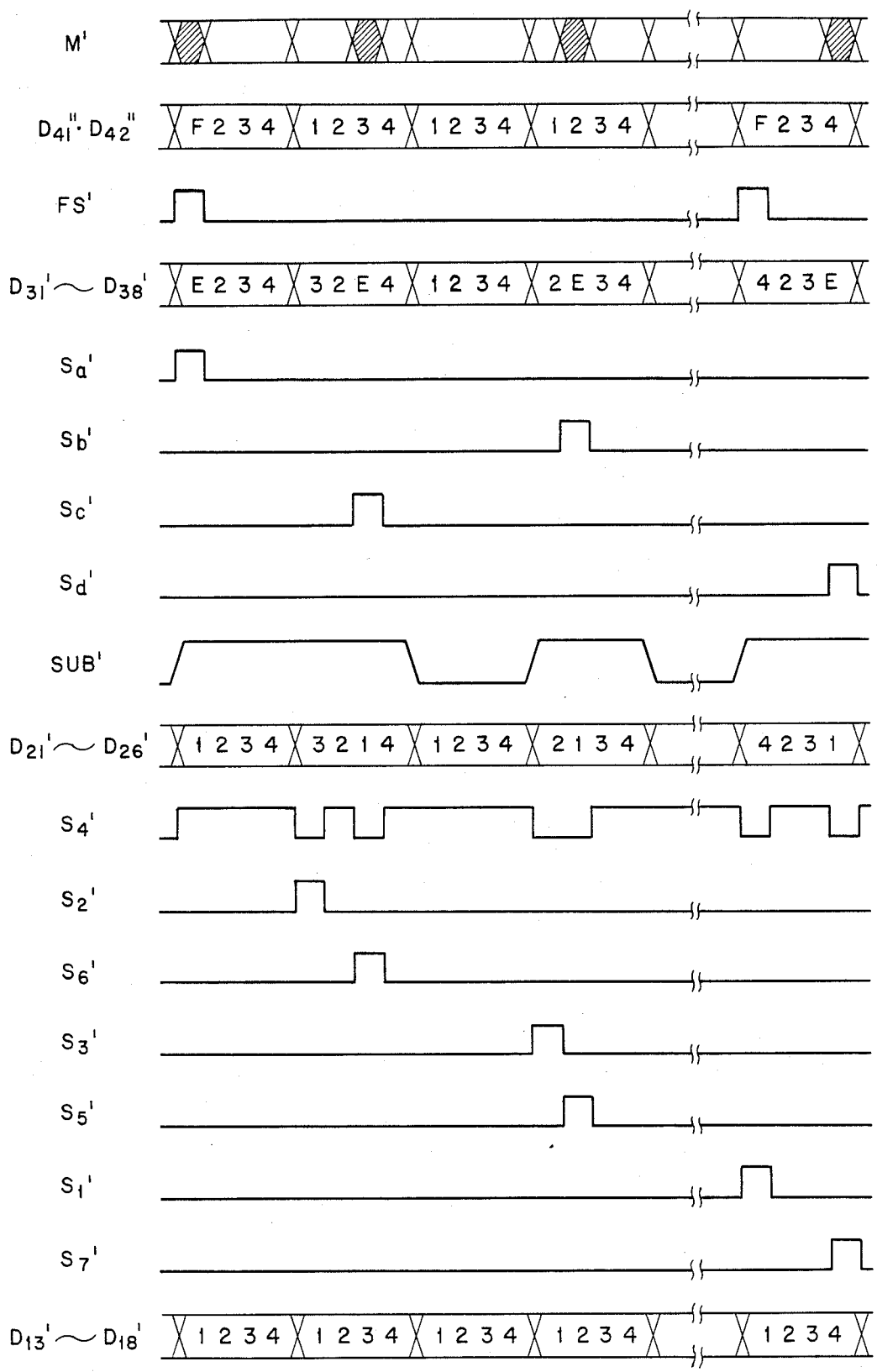
FIG. 7 is a time chart for use in describing operation of the multilevel demodulator illustrated in FIG. 6.

Referring to FIGS. 6 and 7, a multilevel demodulator is for use as a counterpart of the multilevel modulator illustrated with reference to FIG. 1. The multilevel demodulator is for demodulating the multilevel quadrature amplitude modulated signal illustrated with reference to FIG. 1. The multilevel demodulator comprises a phase detector 40, an analog-to-digital converter 41, and a converting circuit 42.

The phase detector 40 is supplied with the multilevel quadrature amplitude modulated signal indicated at M' as illustrated along a top line of FIG. 7. The phase detector 40 carries out phase detection of the multilevel quadrature amplitude modulated signal M' with reference to a pair of quadrature-phase local carrier signals $C_2$ and produces a first analog signal $P_1'$ of the channel P and a second analog signal $Q_1'$ of the other channel Q. Responsive to the first and the second analog signals $P_1'$ and $Q_1'$, the analog-to-digital converter 41 carries out code conversion which is inverse to the code conversion of the digital-to-analog converter 23 (FIG. 1). As a result, the first and the second analog signals $P_1'$ and $Q_1'$ are converted into a binary intermediate signal BIS' as a reproduction of the binary intermediate signal BIS (FIG. 1). The binary intermediate signal BIS' consists of first through tenth bits $D_{41}'$ to $D_{50}'$ which are in one-to-one correspondence to each of the first through the tenth bits $D_{41}$ to $D_{50}$ (FIG. 1). But, each of the first and the second bits $D_{41}'$ and $D_{42}'$ is not always coincident with each of the first and the second bits $D_{41}$ and $D_{42}$ because the first and the second bits $D_{41}'$ and $D_{42}'$ undergo any adverse influence resulting from uncertainty of the phases in the multilevel quadrature amplitude modulator 40. The phase detector 40 and the analog-to-digital converter 41 are exemplified in cited reference hereinbefore.

The binary intermediate signal BIS' is supplied to the converting circuit 42. The converting circuit 42 converts the binary intermediate signal BIS' into a binary output signal OP as a reproduction of the binary input signal described in conjunction with FIG. 1. The binary output signal OP consists of first through eighth reproduction bits $D_{11}'$ to $D_{18}'$, a reproduction subdata signal SUB', and a reproduction frame signal FS', which correspond to the first through the eighth bits $D_{11}'$ to $D_{18}'$, the subdata signal SUB', and the frame signal FS', respectively.

The converting circuit 42 comprises a reception differential logic circuit 43. The reception differential logic circuit 43 carries out conversion which is inverse relative to the conversion of the transmission differential logic circuit 29 (FIG. 1). The reception differential logic circuit 43 produces first and second converted bits $D_{41}''$ and $D_{42}''$ as shown along a second line of FIG. 7. In the manner described in conjunction with FIG. 1, each of the first and the second converted bits $D_{41}''$ and $D_{42}''$ is not subjected to any adverse influence resulting from uncertainty of the phases.

A delay circuit 44 delays the first and the second converted bits $D_{41}''$ and $D_{42}''$ by a preselected delay time into the first and the second bits $D_{11}'$ and $D_{12}'$, respectively. As a result of delay in the delay circuit 44, each of the first and the second bits $D_{11}'$ and $D_{12}'$ is synchronized with the third through the eighth bits $D_{13}'$ to $D_{18}'$ illustrated along a bottom line of FIG. 7.

Responsive to the first and the second converted bits $D_{41}''$ and $D_{42}''$, a frame synchronization unit 45 detects the frame synchronization signal F and produces the reproduction frame signal FS' as illustrated along a third line of FIG. 7. The subdata signal SUB' and the first through the eighth bits $D_{11}'$ to $D_{18}'$ are produced in timed relation to the reproduction frame signal FS'.

The first through the tenth bits $D_{41}'$ to $D_{50}'$ are supplied to a code converting unit 46 which carries out code conversion inverse relative to the conversion of the code converting unit 30 (FIG. 1). Consequently, only the third through the tenth bits $D_{43}'$ to $D_{50}'$ are converted by the code converting unit 30 into a code converted signal CCS' with reference to the first and the second bits $D_{41}'$ and $D_{42}'$. The code converted signal CCS' is a reproduction of the interchanged signal ES (FIG. 1) and consists of first through eighth bits $D_{31}'$ to $D_{38}'$ which are collectively illustrated along a fourth line of FIG. 7. This means that the code converted signal CCS' may have a signal point which falls within the specific area Ae (FIG. 3) at every specific time slot mentioned in conjunction with FIG. 1.

In the converting circuit 42, the code converted signal CCS' is delivered to a discriminating unit 47 and a reception code converting unit 48. The discriminating unit 47 may be called a decoder and discriminates the specific time slot from the code converted signal CCS'. In FIG. 7, the specific time slots are indicated at E along the fourth line. Resultant first through fourth indication signals Sa' to Sd' are produced one at a time from the discriminating unit 47 in synchronism with the specific time slots E when the code converted signal CCS' indicates the specific region Ae. As mentioned in conjunction with FIG. 2, four successive time slots are numbered from unity to four and are related to the first through the fourth indication signals Sa to Sd (FIG. 1). Taking this into consideration, each of the first through the fourth indication signals Sa' to Sd' is illustrated along each of fifth through eighth lines of FIG. 7. More particularly, the discriminating unit 47 produces the first indication signal Sa' when the specific time slot E is a first one of the four successive time slots. Likewise, the third, the second, and the fourth indication signals Sc', Sb', and Sd' appear in synchronism with a third, second, and fourth ones of the four successive time slots.

The discriminating unit 47 further produces the reproduction subdata signal SUB' of logic "1" level in the presence of the specific time slot. Otherwise, the discriminating unit 47 produces the reproduction subdata signal SUB' of the logic "0" level. The reproduction subdata signal SUB' is illustrated along a ninth line of FIG. 7.

The reception code converting unit 48 carries out code conversion which is inverse relative to the code conversion of the transmission code converting unit 26 (FIG. 1). The reception code converting unit 48 converts the code converted signal CCS' of the specific time slot into a converted signal CS of six bits with reference to the first through the fourth indication signals Sa' to Sd'. The converted signal CS consists of first through sixth bits $D_{21}'$ to $D_{26}'$. Each of the first through the sixth bits $D_{21}'$ to $D_{26}'$ is illustrated along a tenth line of FIG. 7.

This shows that the reception code converting unit 48 serves to return the outside signal point previously shifted to the specific region Ae back to a former main signal point placed in one of the first through the fourth zones Aa to Ad (FIG. 3).

For example, the reception code converting unit 48 converts the code converted signal CCS' into the converted signal CS so as to return the outside signal point back to the main signal point of the first zone Aa on reception of the first indication signal Sa'.

With respect to the remaining three time slots except the specific time slot, the reception code converting unit 48 allows the first through the sixth bits $D_{31}'$ to $D_{36}'$ to pass therethrough without any conversion. Such a reception code converting unit 48 may be implemented by logic circuits, switching circuits, and an additional switching circuit like the transmission code converting unit 26 (FIG. 4). However, it is to be noted in the reception code converting unit 48 that each of the logic circuits carries out inverse code conversion of the first through the fourth logic circuits 261a to 261d (FIG. 4) and the additional switching circuit allows the first through the sixth bits $D_{31}'$ to $D_{36}'$ to pass therethrough with the seventh and the eighth bits $D_{37}'$ and $D_{38}'$ removed. Alternatively, the reception code converting unit 47 may be a read only memory which is similar to that described in conjunction with FIG. 4.

In FIG. 6, a logic conversion circuit 49 is supplied with the first through fourth indication signal Sa' to Sd' to produce first through seventh control signals $S_1'$ to $S_7'$, as shown in FIG. 1.

Responsive to the converted signal CS and the first through the fourth indication signals Sa' to Sd', a time slot interchanging unit 50 is put into operation in a manner similar to that described in conjunction with the time slot interchanging unit 27 (FIG. 1). As a result, the converted signal CS is converted into the third through the eighth bits $D_{13}'$ to $D_{18}'$ of the binary output signal OP. The above-mentioned operation of the time slot interchanging unit 50 is inverse relative to the time slot interchanging operation of the time slot interchanging unit 27 (FIG. 1) and may therefore be called inverse time slot interchanging operation. From this fact, it is readily understood that the inverse time slot interchanging operation is carried out within the four successive time slots. As a result, the third through the eighth bits $D_{13}'$ to $D_{18}'$ of the binary output signal OP are relocated to previous or regular time slots, as illustrated along the bottom line of FIG. 7.

Thus, the converting circuit 42 converts the binary intermediate signal BIS' into the binary output signal OP.

A reception rate conversion unit 51 is coupled to the converting circuit 42 to carry out conversion which is inverse relative to the conversion of the rate conversion unit 21 (FIG. 1). The reception rate conversion unit 51 removes the frame signal from the first and the second bit signals $D_{11}'$ and $D_{12}'$ and produces first through eighth binary signals $D_{01}'$ to $D_{08}'$ as a reproduction of the unit input signal UIN (FIG. 1). The first through the eighth binary signals $D_{01}'$ to $D_{08}'$ are produced at the same bit rate from the reception rate conversion unit 51.

Figure 8:
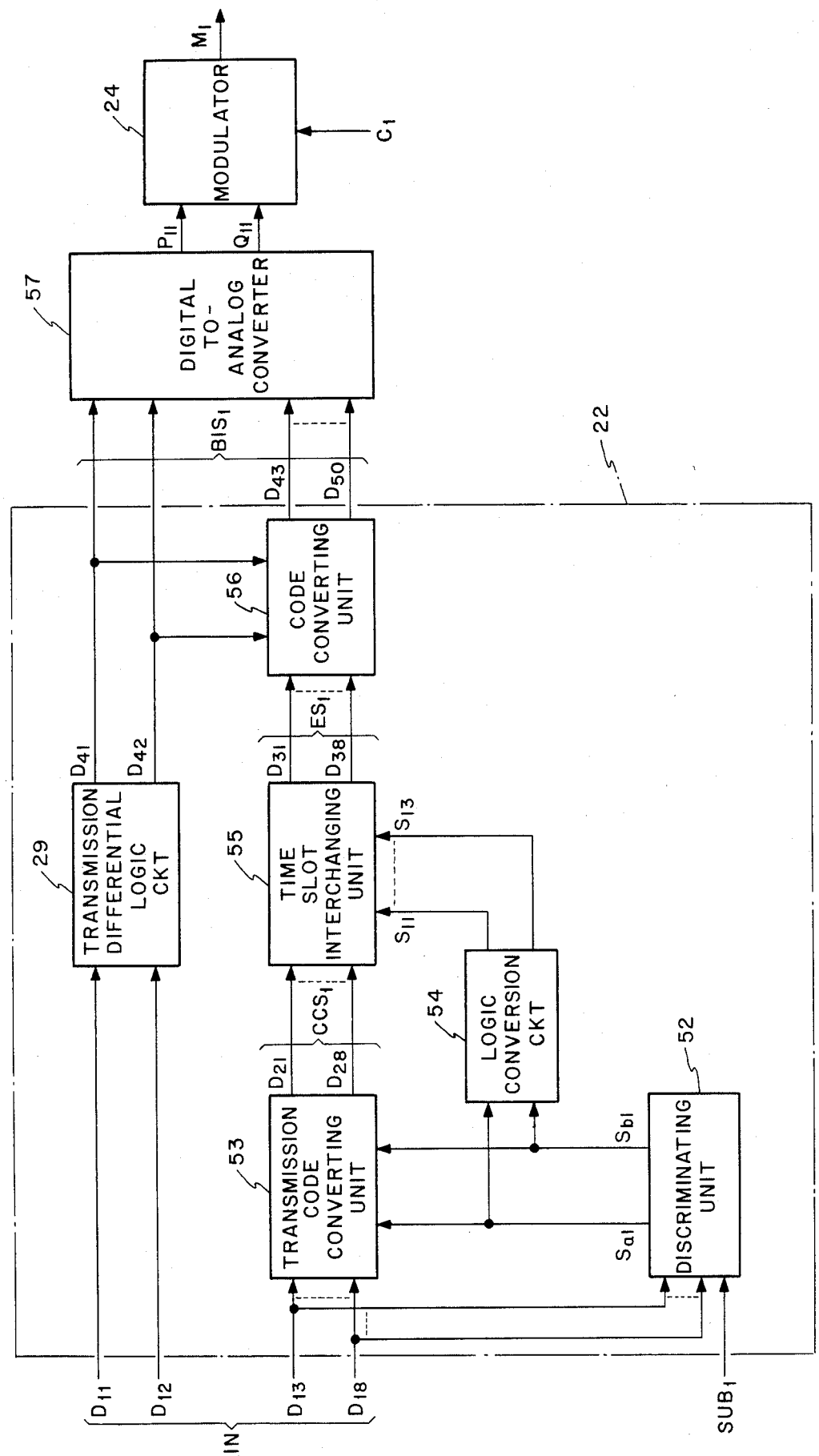
FIG. 8 is a block diagram of a multilevel modulator according to a second embodiment of this invention.

Referring to FIG. 8, a multilevel modulator according to a second embodiment of this invention is similar in structure and operation to that illustrated in FIG. 1 except that a subdata signal $SUB_1$ has a bit rate equal to a half of the bit rate $f_1$ of the main data signal IN. The bit rate of the subdata signal $SUB_1$ may be represented by $f_1/2$. As a result, the number n and the positive integer m are equal to eight and two, respectively. In this event, each of the first through the eighth bits $D_{11}$ to $D_{18}$ of the main data signal IN is partitioned into two bits placed in first and second ones of the time slots. The first and the second time slots are repeated in a manner similar to that illustrated in FIG. 2. The illustrated multilevel modulator modulates the main data signal IN of eight bits into a multilevel quadrature amplitude modulated signal $M_1$ having output signal points of three hundred and eighty-four $(384 = 2^8 + 2^8/2)$.

Figure 9:
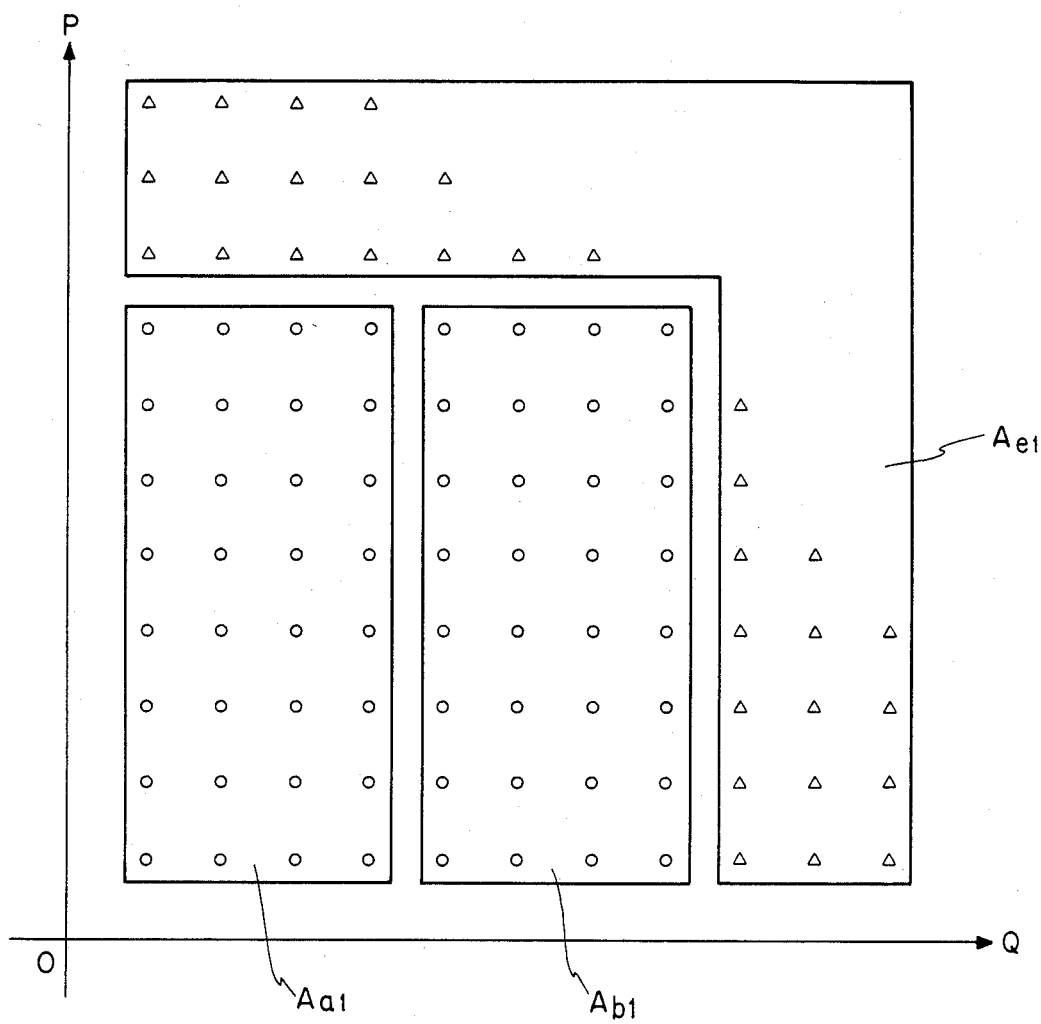
FIG. 9 shows an output signal point distribution of a multilevel quadrature amplitude modulated signal produced by the multilevel modulator illustrated in FIG. 8.

Referring to FIG. 9 in relation to FIG. 8, a quarter of the output signal points is arranged on the first quadrant of the phase plane and consists of sixty-four $(64 = 2^8/4)$ main signal points (shown by small circles) placed in a first domain and thirty-two $(32 = 128/4)$ outside signal points (shown by small triangles) placed in a specific region $Ae_1$ laid outside of the first domain. The first domain is divided into two zones, namely, first and second zones $Aa_1$ and $Ab_1$ because the positive integer m is equal to two. Each of the first and the second zones $Aa_1$ and $Ab_1$ includes thirty-two main signal points which are equal in number to the outside signal points placed in the specific region $Ae_1$.

Referring back to FIG. 8, the converting circuit 22 converts the main data signal IN into a binary intermediate signal $BIS_1$ in accordance with the subdata signal $SUB_1$. Responsive to the subdata signal $SUB_1$ and the third through the eighth bits $D_{13}$ to $D_{18}$, a discriminating unit 52 serves to discriminate the first and the second zones $Aa_1$ and $Ab_1$ at a predetermined time slot, for example, the first time slot. On reception of the subdata signal $SUB_1$ of the logic "1" level, the discriminating unit 52 produces one of first and second indication signals $Sa_1$ and $Sb_1$ in the manner described before. Responsive to the first and the second indication signals $Sa_1$ and $Sb_1$, a transmission code converting unit 53 converts the third through eighth bits $D_{13}$ to $D_{18}$ into a code converted signal $CCS_1$ in the manner described before.

Responsive to the first and the second indication signals $Sa_1$ and $Sb_1$, a logic conversion circuit 54 carries out code conversion like in FIG. 1 and produces first through third control signals $S_{11}$ to $S_{13}$ to a time slot interchanging unit 55.

Responsive to the first through the eighth bits $D_{21}$ to $D_{28}$ and the first through the third control signals $S_{11}$ to $S_{13}$, the time slot interchanging unit 55 carries out time slot interchanging operation in the manner described in conjunction with the time slot interchanging unit 28 of FIG. 1 to produce an interchanged signal $ES_1$.

A code converting unit 56 converts the first through the eighth bits $D_{31}$ to $D_{38}$ into the third through the tenth bits $D_{43}$ to $D_{50}$ of the binary intermediate signal $BIS_1$, as mentioned before.

A digital-to-analog converter 57 converts the binary intermediate signal $BIS_1$ to first and second analog signals $P_{11}$ and $Q_{11}$ each of which has either sixteen or twenty-two amplitude levels.

The first and the second analog signals $P_{11}$ and $Q_{11}$ are modulated by the modulator 24 into the multilevel quadrature amplitude modulated signal $M_1$.

In this case, the multilevel quadrature amplitude modulated signal $M_1$ has the symbol rate represented by $(8f_1+f_1/2)$. Accordingly, the symbol rate of the embodiment can be increased by a factor of $(8f_1+f_1/2)/(8f_1)=17/16$ when the occupied bandwidth is kept unchanged. Alternatively, the occupied bandwidth of the embodiment can be reduced by a factor of 16/17 when the symbol rate is kept unchanged.

Figure 10:
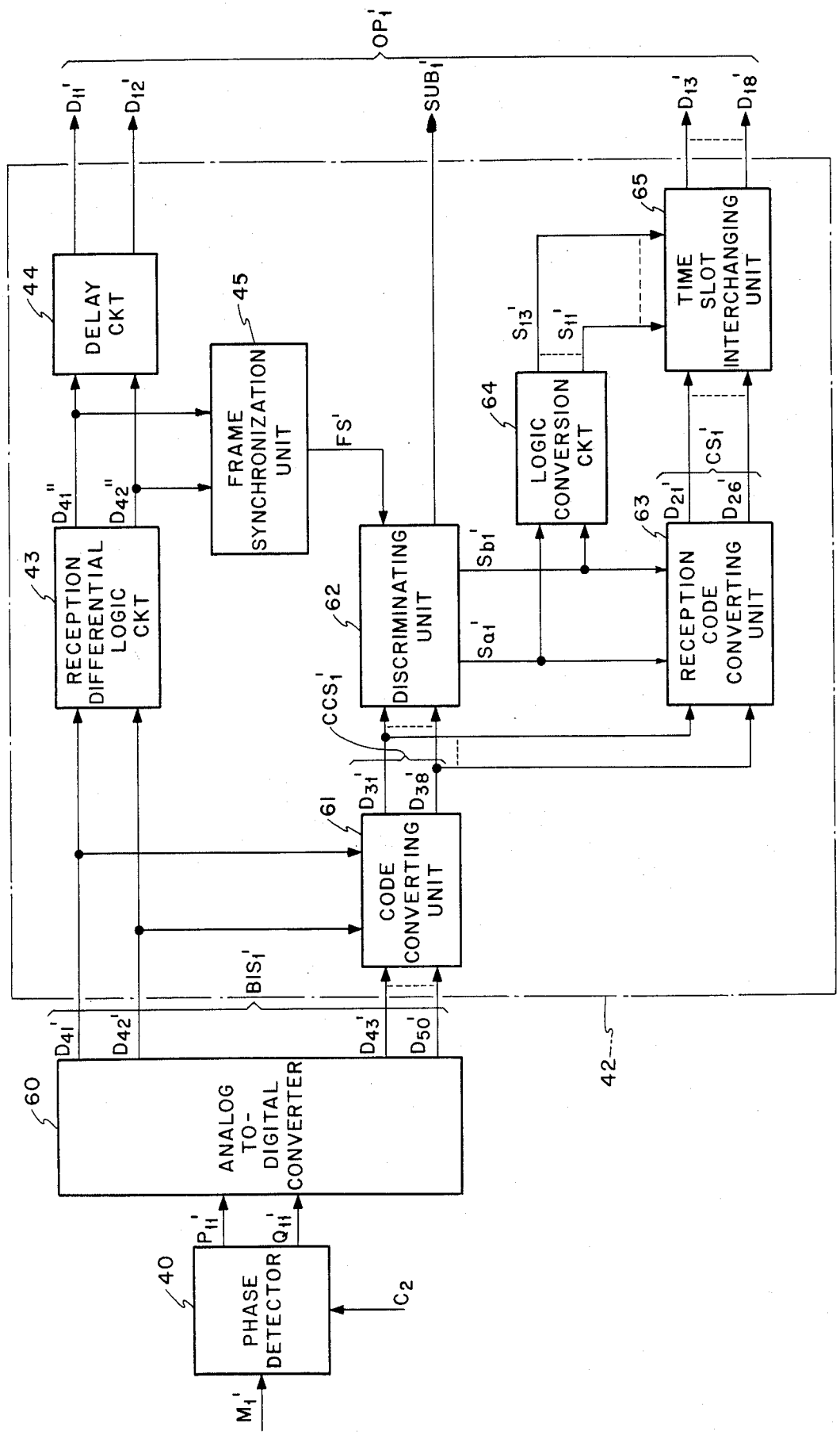
FIG. 10 is a block diagram of a multilevel demodulator for use as a counterpart of the multilevel modulator illustrated in FIG. 8.

Referring to FIG. 10, a multilevel demodulator is for use as a counterpart of the multilevel modulator illustrated with reference to FIG. 8. The multilevel demodulator comprises similar parts designated by like reference numerals in conjunction with FIG. 6. The multilevel demodulator is for demodulating the multilevel quadrature amplitude modulated signal $M_1'$ having output signal points of three hundred and eighty-four.

The phase detector 40 carries out phase detection of the multilevel quadrature amplitude modulated signal $M_1'$ and produces first and second analog signals $P_{11}'$ and $Q_{11}'$. The first and the second analog signals $P_{11}'$ and $Q_{11}'$ are converted by an analog-to-digital converter 60 in the manner described before into a binary intermediate signal $BIS_1'$. The binary intermediate signal $BIS_1'$ consists of first through tenth bits $D_{41}'$ to $D_{50}'$.

A code converting unit 61 carries out conversion which is inverse relative to the conversion of the code converting unit 56 (FIG. 8). The code converting unit 61 converts the third through the tenth bits $D_{43}'$ to $D_{50}'$ of the binary intermediate signal $BIS_1'$ into a code converted signal $CCS_1'$ which consists first through eighth bits $D_{31}'$ to $D_{38}'$.

Responsive to the code converted signal $CCS_1'$ and the reproduction frame signal $FS'$, a discriminating unit 62 produces a reproduction subdata signal $SUB_1'$ and first and second indication signals $Sa_1'$ and $Sb_1'$ in the manner described before. A reception code converting unit 63 converts the first through the eighth bits $D_{31}'$ to $D_{38}'$ of the code converted signal $CCS_1'$ into a converted signal $CS_1'$ of six bits in accordance with the first and the second indication signals $Sa_1'$ and $Sb_1'$ in the manner described before.

A logic conversion circuit 64 produces first through third control signals $S_{11}'$ to $S_{13}'$ in response to the first and the second indication signals $Sa_1'$ and $Sb_1'$ in the manner described before. A time slot interchanging unit 65 carries out inverse time slot interchanging operation of the time slot interchanging unit 55 (FIG. 8) within two successive time slots of the converted signal $CS_1'$ in accordance with the first through the third control signals $S_{11}'$ to $S_{13}'$. As a result, the third through the eighth bits $D_{13}'$ to $D_{18}'$ of a binary output signal $OP_1$ are relocated to regular time slots.

Figure 11:
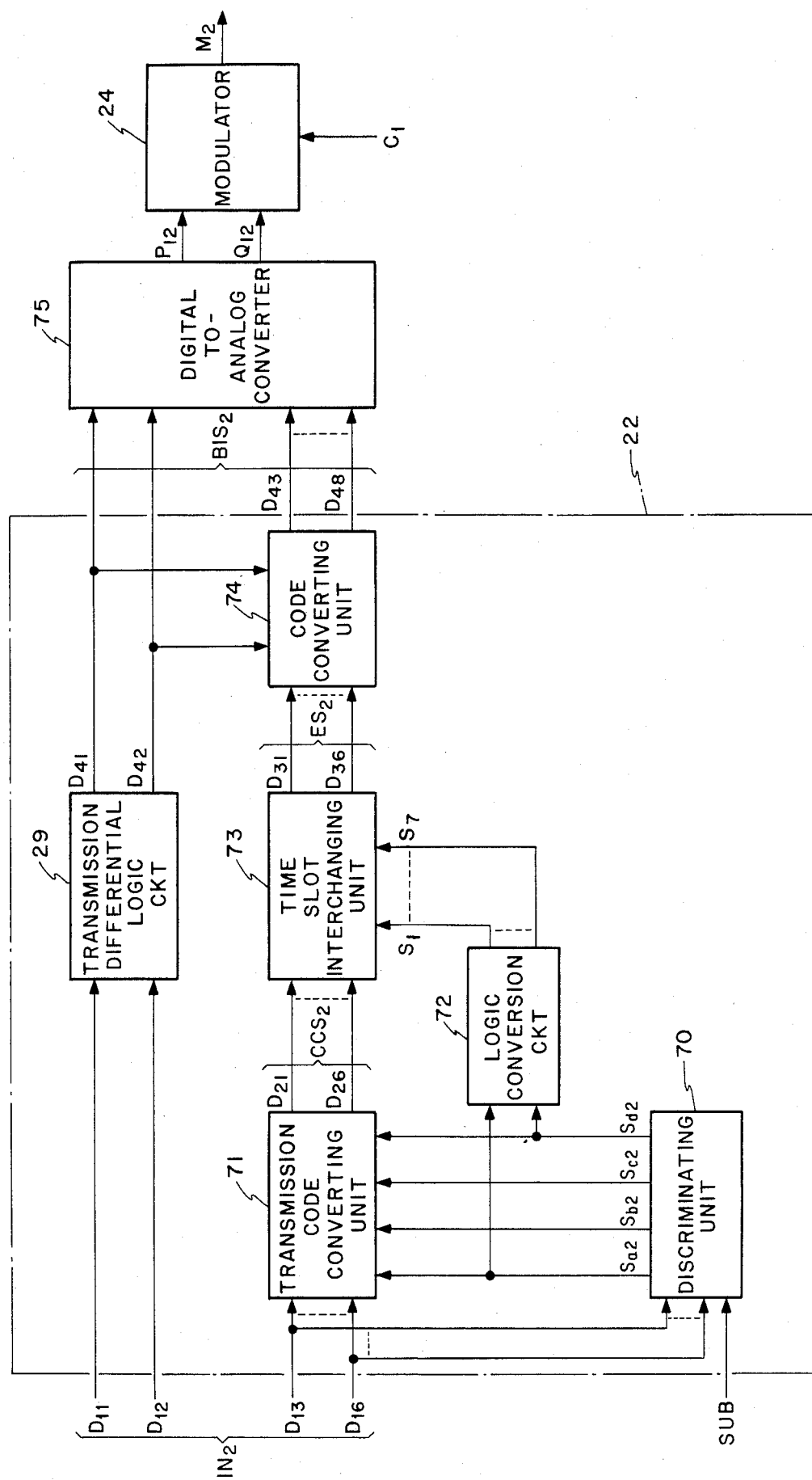
FIG. 11 is a block diagram of a multilevel modulator according to a third embodiment of this invention.

Referring to FIG. 11, a multilevel modulator according to a third embodiment of this invention is similar in structure and operation to that illustrated in FIG. 1 except that a main data signal $IN_2$ consists of first through sixth bits $D_{11}$ to $D_{16}$. The main data signal $IN_2$ has a bit rate $f_1$ equal to four times a bit rate of the subdata signal SUB, as is the case with FIG. 1. Therefore, the main data signal can be partitioned or grouped into four successive bits arranged in the first through the fourth time slots in a manner similar to FIG. 1. In any event, the number n and the positive integer m are equal to six and four, respectively. A multilevel quadrature amplitude modulated signal $M_2$ has output signal points of eighty which are equal to a sum of $2^6$ and $(2^6/4)$.

Figure 12:
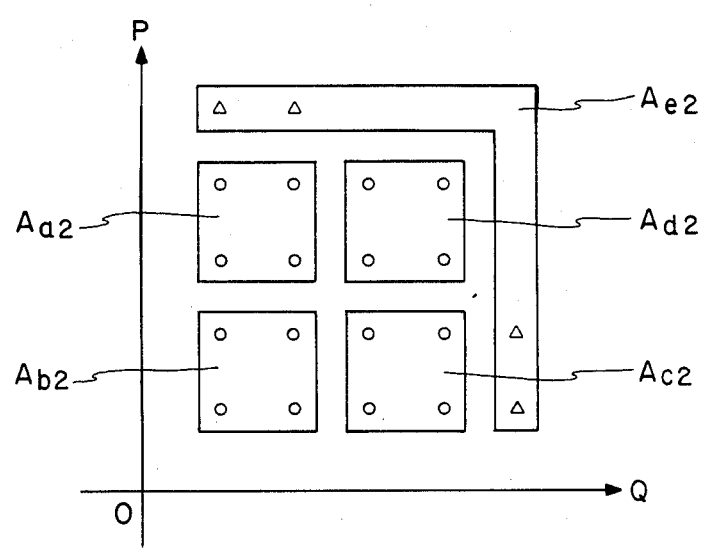
FIG. 12 shows an output signal point distribution of a multilevel quadrature amplitude modulated signal produced by the multilevel modulator illustrated in FIG. 11.

Referring to FIG. 12 in relation to FIG. 11, a quarter of the output signal points is arranged on the first quadrant of the phase plane and consists of sixteen $(16=2^6/4)$ main signal points (shown by small circles) placed in a first domain and four $(4=16/4)$ outside signal points (shown by small triangles) placed in a specific region $Ae_2$ laid outside of the first domain. The first domain is divided into four zones, namely, first through fourth zones $Aa_2$, $Ab_2$, $Ac_2$, and $Ad_2$. Each of the first through the fourth zones $Aa_2$ to $Ad_2$ includes four main signal points which are equal in number to the outside signal points placed in the specific region $Ae_2$.

Referring back to FIG. 11, the converting circuit 22 converts the main data signal $IN_2$ into a binary intermediate signal $BIS_2$ in accordance with the subdata signal SUB. Responsive to the subdata signal SUB and the third through the sixth bits $D_{13}$ to $D_{16}$, a discriminating unit 70 serves to discriminate the first through the fourth zones $Aa_2$ to $Ad_2$ at a predetermined time slot, for example, the first time slot. On reception of the subdata signal SUB of the logic "1" level, the discriminating unit 70 produces one of first through fourth indication signals $Sa_2$ and $Sd_2$ in the manner described before. Responsive to the first through the fourth indication signals $Sa_2$ to $Sd_2$, a transmission code converting unit 71 converts the third through sixth bits $D_{13}$ to $D_{16}$ into a code converted signal $CCS_2$ in the manner described before.

Responsive to the first through the fourth indication signals $Sa_2$ to $Sd_2$, a logic conversion circuit 72 carries out code conversion like in FIG. 1 and produces first through seventh control signals $S_1$ to $S_7$ to a time slot interchanging unit 73.

Responsive to the first through the sixth bits $D_{21}$ to $D_{26}$ and the first through the seventh control signals $S_1$ to $S_7$, the time slot interchanging unit 73 carries out time slot interchanging operation in the manner described in conjunction with the time slot interchanging unit 28 of FIG. 1 to produce an interchanged signal $ES_2$.

A code converting unit 74 converts the first through the sixth bits $D_{31}$ to $D_{36}$ into the third through the eighth bits $D_{43}$ to $D_{48}$ of the binary intermediate signal $BIS_2$, as mentioned before.

A digital-to-analog converter 75 converts the binary intermediate signal $BIS_2$ to first and second analog signals $P_{12}$ and $Q_{12}$ each of which has either eight or ten amplitude levels.

The first and the second analog signals $P_{12}$ and $Q_{12}$ are modulated by the modulator 24 into the multilevel quadrature amplitude modulated signal $M_2$.

In this case, the multilevel quadrature amplitude modulated signal $M_I$ has the symbol rate represented by $(6f_1 + f_1/4)$. Accordingly, the symbol rate of the embodiment can be increased by a factor of $(6f_1 + f_1/4)/(6f_1) = 25/24$ when the occupied bandwidth is kept unchanged. Alternatively, the occupied bandwidth of the embodiment can be reduced by a factor of 24/25 when the symbol rate is kept unchanged.

Figure 13:
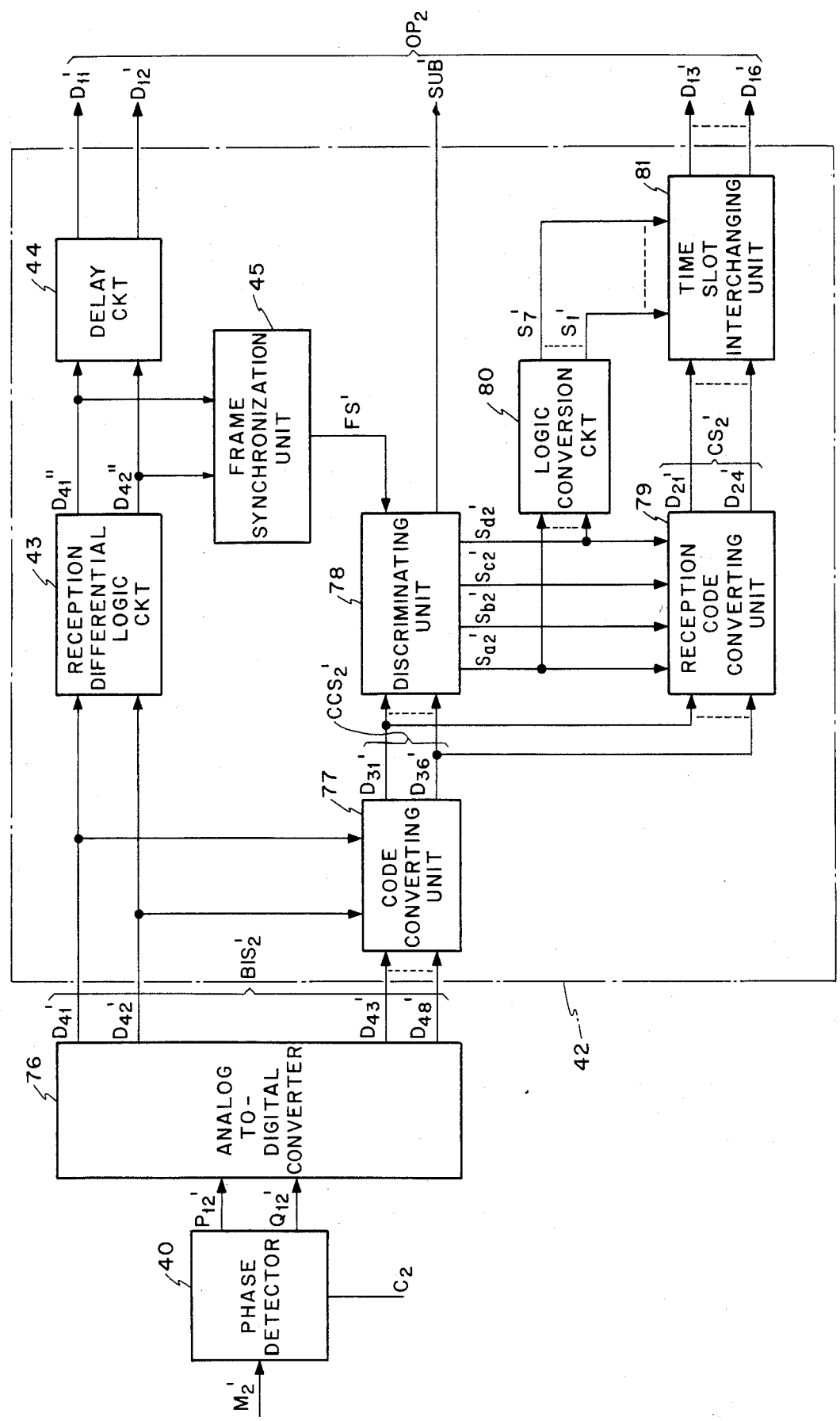
FIG. 13 is a block diagram of a multilevel demodulator for use as a counterpart of the multilevel modulator illustrated in FIG. 11.

Referring to FIG. 13, a multilevel demodulator is for use as a counterpart of the multilevel modulator illustrated with reference to FIG. 11. The multilevel demodulator comprises similar parts designated by like reference numerals in conjunction with FIG. 6. The multilevel demodulator is for demodulating the multilevel quadrature amplitude modulated signal $M_2'$ having output signal points of eighty.

The phase detector 40 carries out phase detection of the multilevel quadrature amplitude modulated signal $M_2'$ and produces first and second analog signals $P_{12}'$ and $Q_{12}'$. The first and the second analog signals $P_{12}'$ and $Q_{12}'$ are converted by an analog-to-digital converter 76 in the manner described before into a binary intermediate signal $BIS_2'$. The binary intermediate signal $BIS_2'$ consists of first through eighth bits $D_{41}'$ to $D_{48}'$.

A code converting unit 77 carries out conversion which is inverse relative to the conversion of the code converting unit 74 (FIG. 11). The code converting unit 77 converts the third through the eighth bits $D_{43}'$ to $D_{48}'$ of the binary intermediate signal $BIS_2'$ into a code converted signal $CCS_2'$ which consists first through sixth bits $D_{31}'$ to $D_{36}'$.

Responsive to the code converted signal $CCS_2'$ and the reproduction frame signal $FS'$, a discriminating unit 78 produces a reproduction subdata signal $SUB'$ and first through fourth indication signals $Sa_2'$ to $Sd_2'$ in the manner described before. A reception code converting unit 79 converts the first through the sixth bits $D_{31}'$ to $D_{36}'$ of the code converted signal $CCS_1'$ into a converted signal $CS_2'$ of four bits in accordance with the first through the fourth indication signals $Sa_2'$ to $Sd_2'$ in the manner described before.

A logic conversion circuit 80 produces first through seventh control signals $S_1'$ to $S_7'$ in response to the first through the fourth indication signals $Sa_2'$ to $Sd_2'$ in the manner described before. A time slot interchanging unit 81 carries out inverse time slot interchanging operation of the time slot interchanging unit 73 (FIG. 11) within four successive time slots of the converted signal $CS_2'$ in accordance with the first through the seventh control signals $S_1'$ to $S_7'$. As a result, the third through the sixth bits $D_{13}'$ to $D_{16}'$ a binary output signal $OP_2$ are relocated to regular time slots.

Figure 14:
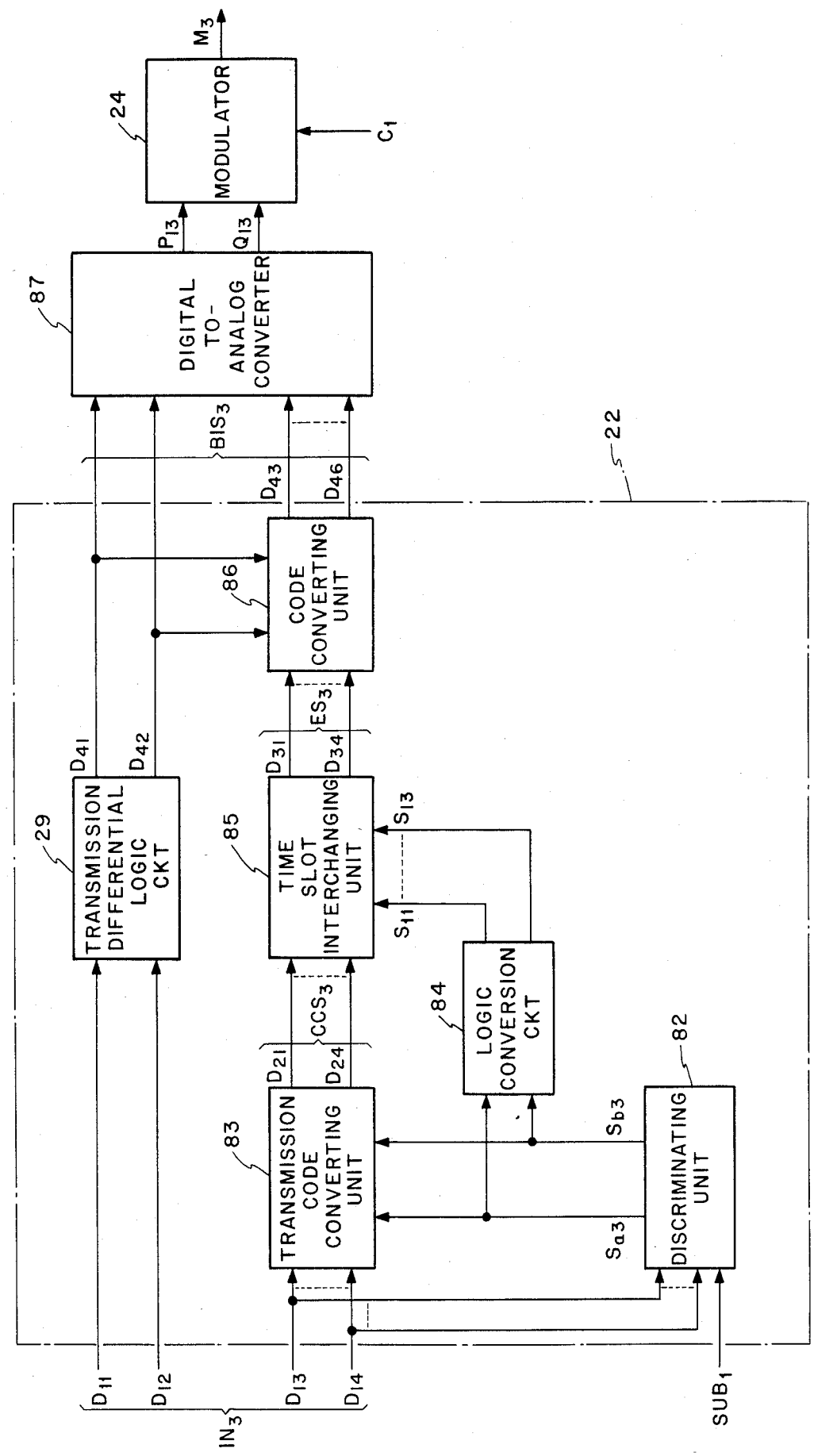
FIG. 14 is a block diagram of a multilevel modulator according to a fourth embodiment of this invention.

Referring to FIG. 14, a multilevel modulator according to a fourth embodiment of this invention is similar in structure and operation to that in FIG. 8 except that a main data signal $IN_3$ consists of first through fourth bits $D_{11}$ to $D_{14}$. The main data signal $IN_3$ has a bit rate $f_1$ equal to two times a bit rate of the subdata signal $SUB_1$, as is the case with FIG. 8. Therefore, the main data signal $IN_3$ can be partitioned into two successive bits arranged in the first and the second time slots in a manner similar to FIG. 8. In any event, the number n and the positive integer m are equal to six and four, respectively. A multilevel quadrature amplitude modulated signal $M_3$ has output signal points of twenty-four which are equal to a sum of $2^4$ and $(2^4/4)$.

Figure 15:
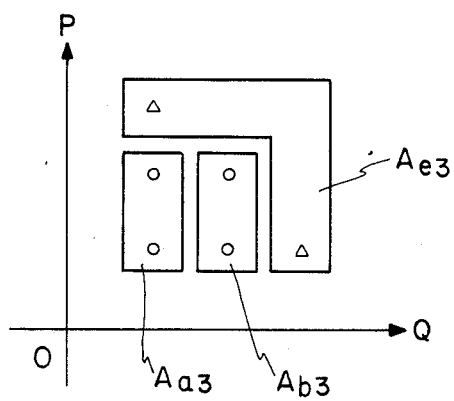
FIG. 15 shows an output signal point distribution of a multilevel quadrature amplitude modulated signal produced by the multilevel modulator illustrated in FIG. 14.

Referring to FIG. 15 in relation to FIG. 14, a quarter of the output signal points is arranged on the first quadrant of the phase plane and consists of four $(4=2^4/4)$ main signal points (shown by small circles) placed in a first domain and two $(2=8/4)$ outside signal points (shown by small triangles) placed in a specific region $Ae_3$ laid outside of the first domain. The first domain is divided into two zones, namely, first and second zones $Aa_3$ and $Ab_3$. Each of the first and the second zones $Aa_3$ and $Ab_3$ includes two main signal points which are equal in number to the outside signal points placed in the specific region $Ae_3$.

Referring back to FIG. 14, the converting circuit 22 converts the main data signal $IN_3$ into a binary intermediate signal $BIS_3$ in accordance with the subdata signal $SUB_1$. Responsive to the subdata signal $SUB_1$ and the third and the fourth bits $D_{13}$ and $D_{14}$, a discriminating unit 82 serves to discriminate the first and the second zones $Aa_3$ and $Ab_3$ at a predetermined time slot, for example, the first time slot. On reception of the subdata signal $SUB_1$ of the logic "1" level, the discriminating unit 82 produces one of first and second indication signals $Sa_3$ and $Sb_3$ in the manner described before. Responsive to the first and the second indication signals $Sa_3$ and $Sb_3$, a transmission code converting unit 83 converts the third and the fourth bits $D_{13}$ and $D_{14}$ into a code converted signal $CCS_3$ in the manner described before.

Responsive to the first and the second indication signals $Sa_3$ and $Sb_3$, a logic conversion circuit 84 carries out code conversion like in FIG. 8 and produces first through third control signals $S_{11}$ to $S_{13}$ to a time slot interchanging unit 85.

Responsive to the first through the fourth bits $D_{21}$ to $D_{24}$ and the first through the third control signals $S_{11}$ to $S_{13}$, the time slot interchanging unit 85 carries out time slot interchanging operation in the manner described in conjunction with the time slot interchanging unit 55 of FIG. 8 to produce an interchanged signal $ES_3$.

A code converting unit 86 converts the first through the fourth bits $D_{31}$ to $D_{34}$ into the third through the sixth bits $D_{43}$ to $D_{46}$ of the binary intermediate signal $BIS_3$, as mentioned before.

A digital-to-analog converter 87 converts the binary intermediate signal $BIS_3$ to first and second analog signals $P_{13}$ and $Q_{13}$ each of which has either four or six amplitude levels.

The first and the second analog signals $P_{13}$ and $Q_{13}$ are modulated by the modulator 24 into the multilevel quadrature amplitude modulated signal $M_3$.

In this case, the multilevel quadrature amplitude modulated signal $M_1$ has the symbol rate represented by $(4f_1+f_1/2)$. Accordingly, the symbol rate of the embodiment can be increased by a factor of $(4f_1+f_1/2)/(4f_1)=9/8$ when the occupied bandwidth is kept unchanged. Alternatively, the occupied bandwidth of the embodiment can be reduced by a factor of 8/9 when the symbol rate is kept unchanged.

Referring to FIG. 16, a multilevel demodulator is for use as a counterpart of the multilevel modulator illustrated with reference to FIG. 14. The multilevel demodulator comprises similar parts designated by like reference numerals in conjunction with FIG. 10. The multilevel demodulator is for demodulating the multilevel quadrature amplitude modulated signal $M_3'$ having output signal points of twenty-four.

The phase detector 40 carries out phase detection of the multilevel quadrature amplitude modulated signal $M_3'$ and produces first and second analog signals $P_{13}'$ and $Q_{13}'$. The first and the second analog signals $P_{13}'$ and $Q_{13}'$ are converted by an analog-to-digital converter 88 in the manner described before into a binary intermediate signal $BIS_3'$. The binary intermediate signal $BIS_3'$ consists of first through sixth bits $D_{41}'$ to $D_{46}'$.

A code converting unit 89 carries out conversion which is inverse relative to the conversion of the code converting unit 86 (FIG. 14). The code converting unit 89 converts the third through the sixth bits $D_{43}'$ to $D_{46}'$ of the binary intermediate signal $BIS_3'$ into a code converted signal $CCS_3'$ which consists first through fourth bits $D_{31}'$ to $D_{34}'$.

Responsive to the code converted signal $CCS_3'$ and the reproduction frame signal $FS'$, a discriminating unit 90 produces a reproduction subdata signal $SUB_1'$ and first and second indication signals $Sa_3'$ and $Sb_3'$ in the manner described before. A reception code converting unit 91 converts the first through the fourth bits $D_{31}'$ to $D_{34}'$ of the code converted signal $CCS_3'$ into a converted signal $CS_3'$ of two bits in accordance with the first and the second indication signals $Sa_3'$ and $Sb_3'$ in the manner described before.

A logic conversion circuit 92 produces first through third control signals $S_{11}'$ to $S_{13}'$ in response to the first and the second indication signals $Sa_3'$ and $Sb_3'$ in the manner described before. A time slot interchanging unit 93 carries out inverse time slot interchanging operation of the time slot interchanging unit 85 (FIG. 14) within a successive two time slots of the converted signal $CS_3'$ in accordance with the first through the third control signals $S_{11}'$ to $S_{13}'$. As a result, the third and the fourth bits $D_{13}'$ to $D_{14}'$ of a binary output signal $OP_3$ are relocated to regular time slots.

Figure 17:
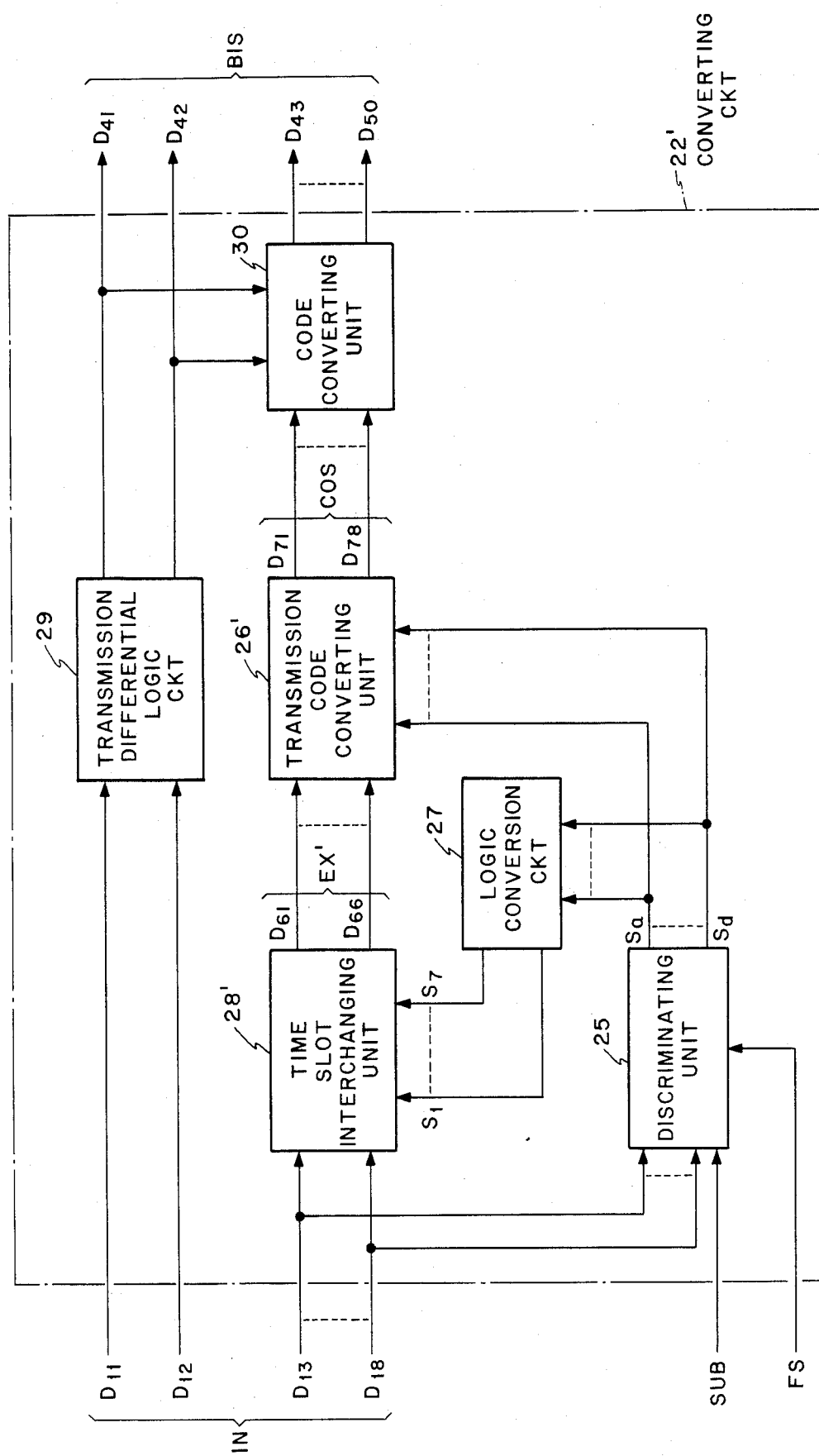
FIG. 17 is a block diagram of a converting circuit operable as another part of the multilevel modulator illustrated in FIG. 1.

Referring to FIG. 17, a multilevel modulator according to a modification of the multilevel modulator illustrated in FIG. 1 comprises a converting circuit 22' similar in structure and operation to that illustrated in FIG. 1. In FIG. 17, it is to be noted that a transmission code converting unit 26' and a time slot interchanging unit 28' are substituted for the time slot interchanging unit 28 and the transmission code converting unit 26 illustrated in FIG. 1, respectively. This means that the time slot interchanging unit 28' may carry out the time slot interchanging operation before code conversion of the transmission code converting unit 26'. More particularly, the time slot interchanging unit 28' interchanges the third through the eighth parallel bits $D_{13}$ to $D_{18}$ of the main data signals IN between a predetermined time slot and a different time slot in accordance with the first through the seventh control signals $S_1$ to $S_7$. The time slot interchanging unit 28' produces an interchanged signal EX'. Then, the transmission code converting unit 26' converts the interchanged signal EX' into a converted signal COS in accordance with the first through the fourth indication signals Sa to Sd. The converted signal COS is converted to the third through the eighth bits $D_{43}$ to $D_{50}$ of the intermediate binary signal BIS by the code converting unit 30. Such construction of the converting circuit 22' is applicable to another multilevel modulator illustrated in FIGS. 8, 11, and 14.

Figure 18:
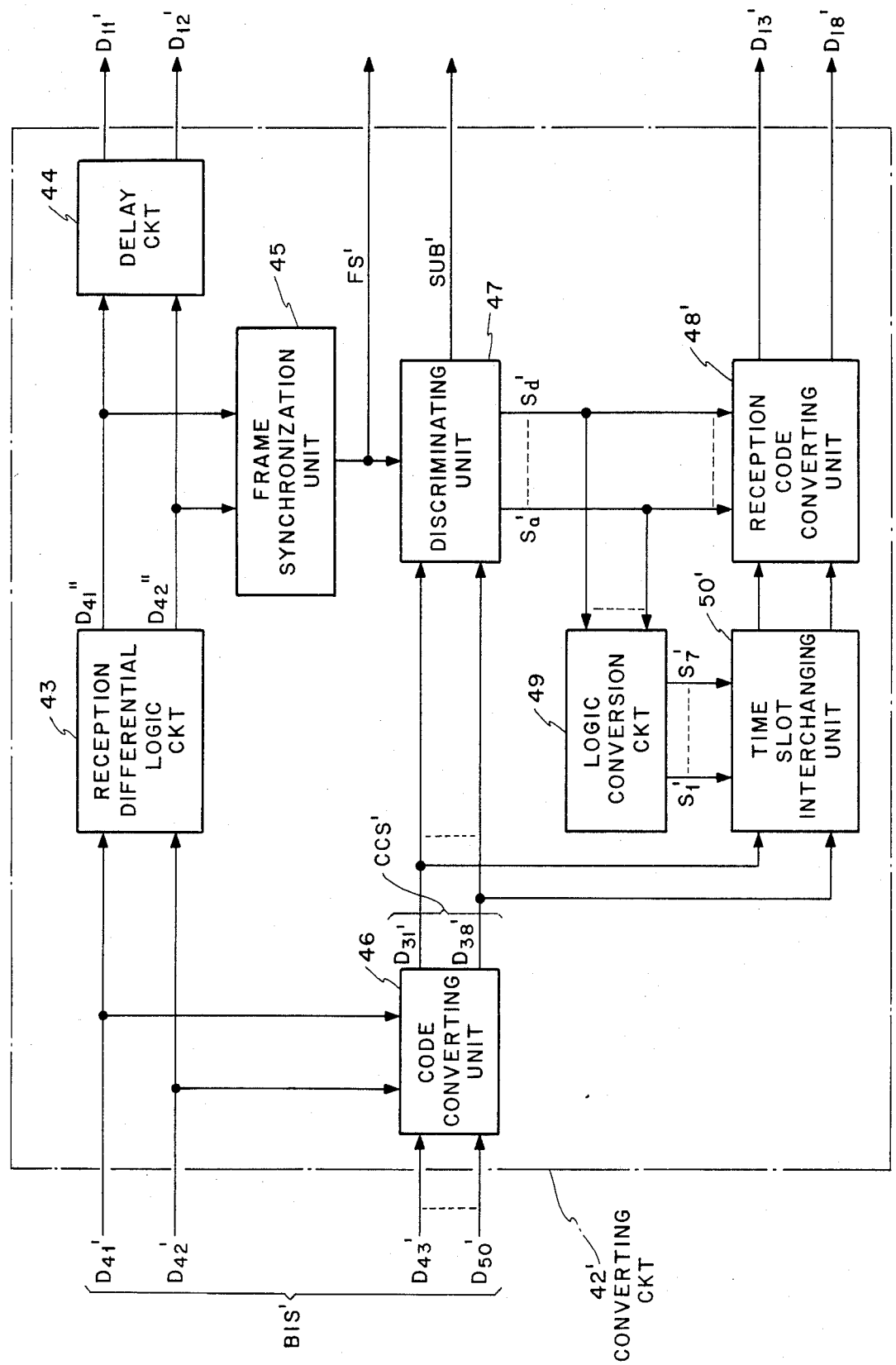
FIG. 18 is a block diagram of a converting circuit operable as another part of the multilevel demodulator illustrated in FIG. 6.

Referring to FIG. 18, a multilevel demodulator is operable in cooperation with the multilevel modulator described in conjunction with FIG. 17 and comprises a converting circuit 42'. The converting circuit 42' is similar to that illustrated in FIG. 6 except that a reception code converting unit 48' and a time slot interchanging unit 50' are substituted for the reception code converting unit 48 and the time slot interchanging unit 50 (FIG. 6), respectively. With this structure, the code converted signal $CCS'$ of the code converting unit 46 is at first delivered to the time slot interchanging unit 50' so as to interchange the time slots for each other under control of the first through the seventh control signals $S_1'$ to $S_7'$ supplied from the logic conversion unit 49. Subsequently, the output signal of the time slot interchanging unit 50' is converted into the third through eighth bits $D_{13}'$ to $D_{18}'$ by the reception code converting unit 48' under control of the first through the fourth indication signals $Sa'$ to $Sd'$.

While this invention has thus far been described in conjunction with several preferred embodiments thereof, it will readily be possible for those skilled in the art to put this invention into practice in various other manners. For example, each of the transmission code converting unit and the reception code converting unit may be implemented by a read only memory. It will be readily understood that the main signal points of $2^n$ are arranged in a main region of a rectangular shape when the number n is the odd number. In this event, it is preferable that the outside signal points of $\alpha$ are arranged outside of the rectangle region along a pair of longer sides.

What is claimed is:

1. A multilevel modulator for modulating a binary input signal into a multilevel quadrature amplitude modulated signal, said binary input signal comprising a main data signal represented by first through n-th bits, each in a time slot where n represents a first predetermined number, and a subdata signal represented by one of a first and a second binary value in each succession of first through m-th time slots where m represents a second predetermined number which is not less than two, wherein the improvement comprises:
   converting means responsive to said main data signal and said subdata signal for converting said main data signal into a binary intermediate signal in accordance with said subdata signal, said binary intermediate signal being represented by first through (n+X)-th intermediate signal bits which specify $2^{(n+X)}$ intermediate signal points where X is equal to two when said first predetermined number is an even number, and equal to unity when said first predetermined number is an odd number;

processing means coupled to said converting means for processing said binary intermediate signal into said multilevel quadrature amplitude modulated signal to reduce said $2^{(n+X)}$ intermediate signal points to $(2^n+\alpha)$ output signal points where $\alpha$ represents an integer which is not less than zero and is not greater than $2^n/m$, said multilevel quadrature amplitude modulated signal being specified on a phase plane which has an origin and real and imaginary axes orthogonally crossing at said origin and which is divisible into a main region having a center point at said origin and an outside region placed outside of said main region, $2^n$ main signal points among said output signal points being in said main region, said main signal points being in one-to-one correspondence to $2^n$ signal values represented by said main data signal only when said subdata signal has said first binary value, $\alpha$ outside signal points among said output signal points being in said outside region.

2. A multilevel modulator as claimed in claim 1, said main region being divided by said real and said imaginary axes into four domains which are congruent with one another and are specified by said first and said second bits of the main data signal, each domain being divided into first through m-th zones which are congruent with one another and correspond to said first through said m-th time slots, respectively, wherein said converting means comprises:

discriminating means responsive to said subdata signal and said third through said n-th bits of said main data signal for discriminating in a predetermined time slot of said first through said m-th time slots one of said zones in the domain specified by said first and said second bits of the main data signal in said predetermined time slot, said one of the zones being the zone in which one of said main signal points is present that corresponds to the signal value represented by said third through said n-th bits of the main data signal in said predetermined time slot, said discriminating means thereby producing an indication signal indicative of said one of the zones only when said subdata signal has said first binary value;

code converting means responsive to said indication signal and said third through said n-th bits of the main data signal for converting said third through said n-th bits to a code converted signal represented by first through (n+X−2)-th converted bits by adding X additional bits to said third through n-th bits in each time slot, the X additional bits of said predetermined time slot being determined by the third through the n-th bits of said main data signal in said predetermined time slot and said indication signal, the X additional bits in each of other time slots being determined only by the third through the (n−2)-th bits of said main data signal in said each of other time slots; and time slot interchanging means responsive to said indiation signal and said code converting signal for producing said binary intermediate signal in which the third through the (n+X)-th intermediate signal bits in said predetermined time slot are the third through the (n+X)-th intermediate signal bits of a different time slot, the third through the (n+X)-th intermediate signal bits of said different time slot being the third through the (n+X)-th intermediate signal bits of said predetermined time slot, said different time slot corresponding to said one of the zones.

3. A multilevel modulator as claimed in claim 1, said main region being divided by said real and said imaginary axes into four domains which are congruent with one another and are specified by said first and said second bits of the main data signal, each domain being divided into first through m-th zones which are congruent with one another and correspond to said first through said m-th time slots, respectively, wherein said converting means comprises:

discriminating means responsive to said subdata signal and said third through said n-th bits of said main data signal for discriminating in a predetermined time slot of said first through said m-th time slots one of said zones in the domain specified by said first and said second bits of the main data signal in said predetermined time slot, said one of the zones being the zone in which one of said main signal points is present that corresponds to the signal value represented by said third through said n-th bits of the main data signal in said predetermined time slot, said discriminating means thereby producing an indication signal indicative of said one of the zones only when said subdata signal has said first binary value;

time slot interchanging means responsive to said indication signal and said third through said n-th bits of the main data signal for producing a time slot interchanged signal represented by first through (n−2)-th interchanged bits in each of said first through said m-th time slots, said first through said (n−2)-th interchanged bits of said predetermined time slot being the third through the n-th bits of said main data signal in a different time slot, said first through (n−2)-th interchanged bits of said different time slot being the third through the n-th bits of said main data signal in said predetermined time slot, said different time slot corresponding to said one of the zones; and code converting means responsive to said indication signal and said time slot interchanged signal for converting said time slot interchanged signal to said binary intermediate signal by adding X additional bits to said first through said (n−2)-th interchanged bits in each time slot, the X additional bits of said different time slot being determined by the first through the (n−2)-th interchanged bits in said different time slot and said indication signal, the X additional bits in each of other time slots being determined only by the first through the (n−2)-th interchanged bits in said each of other time slots.

4. A multilevel demodulator for use in demodulating a multilevel quadrature amplitude modulated signal which is modulated by a binary input signal, said binary input signal comprising a main data signal represented by first through n-th bits, each in a time slot where n represents a first predetermined number, and a subdata signal represented by one of a first and a second binary value in each succession of first through m-th time slots where m represents a second predetermined number which is not less than two, said multilevel demodulator including processing means for processing said multilevel quadrature amplitude modulated signal into a binary intermediate signal represented by first through (n+X)-th intermediate signal bits where X is equal to two when said first predetermined number is an even number and equal to unity when said first predetermined number is an odd number, wherein the improvement comprises:

converting means coupled to said processing means for converting said binary intermediate signal into a binary output signal as a reproduction of said main data signal and a reproduction of said subdata signal.

5. A multilevel demodulator as claimed in claim 4, the first and the second bits of said main data signal conveying a frame synchronization signal every an integral of m time slots, the third through the n-th bits of said main data signal having $2^{(n-2)}$ signal values which are classified into first though m-th groups according to said first though said m-th time slots, respectively, the third through the n-th bits of said main data signal being converted into a modulator converted signal in a predetermined time slot of said first through said m-th time slots only when said subdata signal has said first binary value, the third through the n-th bits of said main data signal of the first through the m-th time slots except for said predetermined time slot being kept untouched as a non-converted signal, said modulator converted signal and said non-converted signal being represented by the third through the n-th bits of said main data signal and X additional bits as first through (n+X−2)-th bits, said X additional bits being for representing whether or not the third through the n-th bits of said main data signal are converted, the third through the (n+X−2)-th bits of said modulator converted signal in said predetermined time slot being interchanged between said predetermined time slot and a different time slot which corresponds to one of the groups, said processing means producing said binary intermediate signal as a reproduction of the first and the second bits of said main data signal and the first through the (n+X−2)-th bits of said modulator converted signal, wherein said converting means comprises:

frame synchronization means responsive to first and second bits of said binary intermediate signal for producing a frame signal in synchronism with said frame synchronization signal;

discriminating means responsive to said frame signal and third through (n+X)-th bits of said binary intermediate signal for discriminating within said first through m-th time slots one of the groups, said one of the groups being the group in which the third through the n-th bits of said main data signal are converted to said modulator converted signal, said discriminating means thereby producing said reproduction of the subdata signal and an indication signal indicative of said one of the groups;

code converting means responsive to said indication signal and the third through the (n+X)-th bits of said binary intermediate signal for converting the third through the (n+X)-th bits of said binary intermediate signal into a demodulator code converted signal represented by first through (n−2)-th converted bits by removing said X additional bits from said third through (n+X)-th bits in each time slot; and time slot interchanging means responsive to said indication signal and said demodulator code converted signal for producing said binary output signal in which third through n-th output signal bits in said different time slot are the first through the (n−2)-th converted bits of said predetermined time slot, the third through the n-th output signal bits of said predetermined time slot being the first through the (n−2)-th converted bits of said different time slot.

6. A multilevel demodulator as claimed in claim 4, the first and the second bits of said main data signal conveying a frame synchronization signal every an integral of m time slots, the third through the n-th bits of said main data signal having $2^{(n-2)}$ signal values which are classified into first through m-th group according to said first through said m-th time slots, respectively, the third through the n-th bits of said main data signal being converted into a modulator converted signal in a predetermined time slot of said first through said m-th time slots only when said subdata signal has said first binary value, the third through the n-th bits of said main data signal of the first through the m-th time slots except for said predetermined time slot being kept untouched as a non-converted signal, said modulator converted signal and said non-converted signal being represented by the third through the n-th bits of said main data signal and X additional bits as first through (n+X−2)-th bits, said X additional bits being for representing whether or not the third through the n-th bits of said main data signal are converted, the third through the (n+X−2)-th bits of said modulator converted signal in said predetermined time slot being interchanged between said predetermined time slot and a different time slot which corresponds to one of the groups, said processing means producing said binary intermediate signal as a reproduction of the first and the second bits of said main data signal and the first through the (n+X−2)-th bits of said modulator converted signal, wherein said converting means comprises:

frame synchronization means responsive to first and second bits of said binary intermediate signal for producing a frame signal in synchronism with said frame synchronization signal;

discriminating means repsonsive to said frame signal and third through (n+X)-th bits of said binary intermediate signal for discriminating within said first through m-th time slots one of the groups, said one of the groups being the group in which the third through the n-th bits of said main data signal are converted to said modulator converted signal, said discriminating means thereby producing said reproduction of the subdata signal and an indication signal indicative of said one of the groups;

time slot interchanging means responsive to said indication signal and the third through the (n+X)-th bits of said binary intermediate signal for producing a time slot interchanged signal represented by first through (n+X−2)-th interchanged bits in each of said first through said m-th time slots, said first through (n+X−2)-th interchanged bits of said different time slot being the third through the (n+X)-th bits of said binary intermediate signal in said predetermined time slot, said first through (n+X−2)-th interchanged bits of said predetermined time slot being the third through the (n+X)-th bits of said binary intermediate signal in said different time slot; and code converting means responsive to said indication signal and said time slot interchanged signal for converting said time slot interchanged signal to said binary output signal by removing X additional bits from said first through said (n+X−2)-th interchanged bits in each time slots.

* * * * *